(12) United States Patent
Cheng et al.

(10) Patent No.: US 12,148,214 B2
(45) Date of Patent: Nov. 19, 2024

(54) TRANSFORMER-BASED TEMPORAL DETECTION IN VIDEO

(71) Applicant: Baidu USA, LLC, Sunnyvale, CA (US)

(72) Inventors: Zhiyu Cheng, Sunnyvale, CA (US); Le Kang, Dublin, CA (US); Xin Zhou, Mountain View, CA (US); Hao Tian, Cupertino, CA (US); Xing Li, Santa Clara, CA (US); Bo He, Sunnyvale, CA (US); Jingyu Xin, Tucson, AZ (US)

(73) Assignee: Baidu USA LLC

( * ) Notice: Subject to any disclaimer, the term of this patent is extended or adjusted under 35 U.S.C. 154(b) by 419 days.

(21) Appl. No.: 17/572,624

(22) Filed: Jan. 10, 2022

(65) Prior Publication Data

US 2023/0055636 A1     Feb. 23, 2023

Related U.S. Application Data

(63) Continuation-in-part of application No. 17/393,373, filed on Aug. 3, 2021, now Pat. No. 11,769,327.
(Continued)

(51) Int. Cl.
*G06N 3/08*   (2023.01)
*G06N 3/09*   (2023.01)
(Continued)

(52) U.S. Cl.
CPC .............. *G06V 20/47* (2022.01); *G06N 3/08* (2013.01); *G06V 10/42* (2022.01); *G06V 20/42* (2022.01)

(58) Field of Classification Search
CPC ........ G06N 3/045; G06N 3/0464; G06N 3/08; G06N 3/09; G06N 3/096; G06V 10/42; G06V 10/82; G06V 20/42; G06V 20/47
(Continued)

(56) References Cited

U.S. PATENT DOCUMENTS 9,646,651 B1    5/2017  Richardson
10,303,768 B2 *  5/2019  Divakaran ............. G06V 20/46
(Continued)

OTHER PUBLICATIONS

Saraogi et al.,"Event recognition in broadcast soccer videos," In Indian Conf. Comput. Vision, Graph. Image Process., pp. 1-7, Dec. 2016. (7pgs).
(Continued)

*Primary Examiner* — Daquan Zhao
(74) *Attorney, Agent, or Firm* — Oppedahl Patent Law Firm LLC

(57) ABSTRACT

With rapidly evolving technologies and emerging tools, sports-related videos generated online are rapidly increasing. To automate the sports video editing/highlight generation process, a key task is to precisely recognize and locate events-of-interest in videos. Embodiments herein comprise a two-stage paradigm to detect categories of events and when these events happen in videos. In one or more embodiments, multiple action recognition models extract high-level semantic features, and a transformer-based temporal detection module locates target events. These novel approaches achieved state-of-the-art performance in both action spotting and replay grounding. While presented in the context of sports, it shall be noted that the systems and methods herein may be used for videos comprising other content and events.

20 Claims, 34 Drawing Sheets

Related U.S. Application Data

(60) Provisional application No. 63/124,832, filed on Dec. 13, 2020.

(51) Int. Cl.
    *G06V 10/42*         (2022.01)
    *G06V 20/40*         (2022.01)

(58) Field of Classification Search
    USPC ..... 706/15, 25, 28, 41, 31, 2, 5, 6; 382/190, 382/181
    See application file for complete search history.

(56) References Cited

U.S. PATENT DOCUMENTS

| | | | |
|---|---|---|---|
| 2002/0051077 | A1 | 5/2002 | Liou |
| 2007/0171303 | A1 | 7/2007 | Barbieri |
| 2016/0014482 | A1 | 1/2016 | Chen |
| 2016/0104513 | A1 | 4/2016 | Bloch |
| 2017/0147906 | A1* | 5/2017 | Shekhar ............... G06V 20/62 |
| 2020/0258241 | A1* | 8/2020 | Liu ............... G06V 20/41 |
| 2021/0248375 | A1* | 8/2021 | Geng ............... G06F 16/9035 |
| 2021/0256051 | A1* | 8/2021 | Wang ............... G06F 16/45 |
| 2021/0272599 | A1* | 9/2021 | Patterson ............... G06N 3/08 |
| 2021/0319232 | A1* | 10/2021 | Perazzi ............... G06N 3/08 |
| 2022/0014807 | A1* | 1/2022 | Lin ............... G06V 20/635 |
| 2022/0124257 | A1 | 4/2022 | Zhao |
| 2022/0327835 | A1* | 10/2022 | Ning ............... G06V 10/82 |

OTHER PUBLICATIONS

Shao et al.,"CrowdHuman: A benchmark for detecting human in a crowd," arXiv preprint arXiv:1805.00123, 2018. (9pgs).

Sigari et al.,"A framework for dynamic restructuring of semantic video analysis systems based on learning attention control," Image and Vis. Comp., 53:20-34, 2016. [Abstract] (2pgs).

Song et al.,"Distractor-aware tracker with a domain-special optimized benchmark for soccer player tracking," Assoc. for Comput. Machinery, In Int. Conf. Multimedia Retrieval, p. 276-284, 2021. (9pgs).

Sullivan et al.,"Tracking and labelling of interacting multiple targets," In Eur. Conf. Comput. Vis. (ECCV), vol. 3953 of Lect. Notes Comput. Sci., 2006. (15pgs).

Sun et al.,"Deep affinity network for multiple object tracking," arXiv preprint arXiv:1810.11780, 2019. (15pgs).

Sundararaman et al.,"Tracking pedestrian heads in dense crowd," arXiv preprint arXiv: 2103.13516, 2021. (16pgs).

SuperAnnotate AI [online], [Retrieved Mar. 20, 2023]. Retrieved from Internet <URL:https://superannotate.com>(8pgs).

Nekoui et al., "FALCONS:FAast Learner-grader for CONtorted poses in Sports," In IEEE Int. Conf. Comput. Vis. and Pattern Recogn. Work.(CVPRW), 2020. (9pgs).

Nillius et al.,"Multi-target tracking-linking identities using Bayesian network inference," In IEEE Int. Conf. Comput. Vis. and Pattern Recogn. (CVPR), 2006. (8pgs).

Pedersen et al.,"3D-ZeF: A 3D zebrafish tracking benchmark dataset," arXiv preprint arXiv:2006.08466, 2020. (20pgs).

Pettersen et al.,"Soccer video and player position dataset," In ACM Multimedia Syst. Conf., Singapore, Singapore, Mar. 2014. (7pgs).

Rao et al.,"A novel algorithm for detection of soccer ball and player," In Int. Conf. Commun. and Signal Process. (ICCSP), 2015. (5pgs).

Ren et al.,"Faster R-CNN: Towards real-time object detection with region proposal networks," IEEE Trans. Pattern Anal. Mach. Intell., 39(6):1137-1149, Jun. 2017. (9pgs).

Romero-Ferrero et al.,"idtracker. ai: tracking all individuals in small or large collectives of unmarked animals," Nat. methods, 16(2):179-182, Jan. 2019. (56pgs).

Sah et al.,"Evaluation of image representations for player detection in field sports using convolutional neural networks," In Int. Conf. Theory Appl. Fuzzy Syst. Soft Comput., vol. 896 of Adv. in Intell. Syst. & Comput., Springer, 2019. (8pgs).

Sanford et al.,"Group activity detection from trajectory and video data in soccer," arXiv preprint arXiv:2004.10299, 2020. (9gps).

Figueroa et al.,"Tracking soccer players using the graph representation," In IEEE Int. Conf. Pattern Recogn. (ICPR), 2004. (5pgs).

Gao et al.,"Automatic key moment extraction and highlights generation based on comprehensive soccer video understanding," In IEEE Int. Conf. Multimedia and Expo Work. (ICMEW) 2020. (5pgs) [Abstract Only].

Ge et al.,"YOLOX: Exceeding YOLO series in 2021," arXiv preprint arXiv: 2107.08430, 2021. (7pgs).

Geiger et al.,"Are we ready for autonomous Driving? The KITTI vision benchmark suite," In IEEE Int. Conf. Comput. Vis. and Pattern Recogn (CVPR), In IEEE Int. Conf. Comput. Vis. and Pattern Recogn.(CVPR), 2012. (8pgs).

Gerke et al.,"Soccer player recognition using spatial constellation features and jersey number recognition," [online], [Retrieved Mar. 15, 2023]. Retrieved from Internet <URL: https://doi.org/10.1016/j.cviu.2017.04.010> [Abstract] (6pgs).

Hurault et al.,"Self-supervised small soccer player detection and tracking," arXiv preprint arXiv:2011.10336, 2020. (14 pgs).

Istasse et al.,"Associative embedding for team discrimination," n IEEE Int. Conf. Comput. Vis. and Pattern Recogn. Work. (CVPRW), 2019. (10 pgs).

Bewley et al.,"Simple online and realtime tracking," arXiv preprint arXiv:1602.00763, 2016. (5 pgs).

Bochinski et al.,"Extending IOU based multi-object tracking by visual information," In IEEE Int. Conf. Adv. Video & Signal Based Surveillance (AVSS), 2018. (6pgs).

"Byte Track Code," [online], [Retrieved Mar. 27, 2023]. Retrieved from Internet <URL:https://github.com/ifzhang/ByteTrack> (1pg).

Cioppa et al.,"Camera Calibration and Player Localization in SoccerNet-v2 and Investigation of their Representations for Action Spotting" In IEEE Int. Conf. Comput. Vis. & Pattern Recogn Work (CVPRW), Jun. 2021. (11pgs).

Cioppa et al.,"ARTHuS: Adaptive Real-Time Human Segmentation in Sports through Online Distillation," In IEEE Int. Conf. Comput. Vis. & Pattern Recogn Work (CVPRW), 2019. (10pg.

Cioppa et al.,"Multimodal & multiview distillation for real-time player detection on a football field," IEEE Int. Conf. Comput. Vis. & Pattern Recogn. Work.(CVPRW), 2020.(10pgs).

Dave et al.,"TAO: A Large-Scale Benchmark for Tracking Any Object," arXiv preprint arXiv:2005.10356, 2020. (32pgs).

DeepSORT in PaddleDetection [online], [Retrieved Feb. 27, 2023]. Retrieved from Internet <URL:https://github.com/PaddlePaddle/PaddleDetection> (1pg).

Dendorfer et al.,"MOT20: A benchmark for multi object tracking in crowded scenes," arXiv preprint arXiv: 2003.09003, 2020. (7pgs).

Iwase et al.,"Parallel tracking of all soccer players by integrating detected positions in multiple view images," In IEEE Int. Conf. Pattern Recogn. (ICPR), 2004. (4pgs).

Jiang et al.,"Automatic soccer video event detection based on a deep neural network combined CNN and RNN," In IEEE Int. Conf. Tools with Artif.Intell. (ICTAI), 2016. [Abstract] (4pgs).

Jiang et al.,"SoccerDB: A large-scale database for comprehensive video understanding," arXiv preprint arXiv:1912.04465, 2020. (8pgs).

R.E. Kalman,"A new approach to linear filtering and prediction problems," J. Basic Eng., 82(1):35-45 1960. (12 pgs).

Khan et al.,"Learning deep C3D features for soccer video event detection," In Int. Conf. Emerging Technol. (ICET), 2018. [Abstract] (4 pgs).

Koshkina et al,"Contrastive learning for sports video: Unsupervised player classification," arXiv preprint arXiv:2104.10068, 2021. (11pgs).

Leal-Taix'e et al.,"MOTchallenge 2015: Towards a benchmark for multi-target tracking," arXiv preprint arXiv:1504.01942, 2015. (15 pgs).

Li et al.,"Jersey number recognition with semi-supervised spatial transformer network," In IEEE Int. Conf. Comput. Vis. and Pattern Recogn. Work. (CVPRW), 2018. (8pgs).

Liu et al.,"Pose-guided R-CNN for jersey number recognition in sports," In IEEE Int. Conf. Comput. Vis. and Pattern Recogn.Work. (CVPRW), 2019. (10 pgs).

(56) References Cited

OTHER PUBLICATIONS

Bo He et al.,"GTA: Global temporal attention for video action understanding," arXiv preprint arXiv:2012.08510v1, 2020. (12pgs).
He et al.,"Deep residual learning for image recognition," IEEE Conference on Computer Vision and Pattern Recognition (CVPR), 2016. (9pgs).
Krizhevsky et al.,"ImageNet classification with deep convolutional neural networks," Advances in neural information processing systems, 2012. (9pgs).
Neimark et al.,"Video Transformer Network," arXiv preprint arXiv:2102.00719, Aug. 17, 2021. (11pgs).
Sanford et al.,"Group activity detection from trajectory & video data in soccer," IEEE/CVF Conf. on Computer Vision & Pattern Recognition Workshops (CVPRW), 2020. (9pgs).
Thomas et al.,"Computer vision for sports: Current applications and research topics," Computer Vision and Image Understanding, 2017. (37pgs).
Tran et al.,"Video classification with channel-separated convolutional networks," IEEE/CVF International Conference on Computer Vision (ICCV), 2019. (10pgs).
Vanderplaetse et al.,"Improved soccer action spotting using both audio & video streams," IEEE/CVF Conf. on Computer Vision & Pattern Recognition Workshops (CVPRW), 2020. (11pg).
Vaswani et al.,"Attention is all you need," arXiv preprint arXiv:1706.03762, 2017. (15 pgs).
Yang et al.,"Temporal pyramid network for action recognition," IEEE/CVF Conference on Computer Vision & Pattern Recognition (CVPR), 2020. (10 pgs).
Vanderplaetse et al.,"Improved Soccer Action Spotting using both Audio & Video Streams," IEEE/CVF Con on Computer Vision & Pattern Recognition Workshops (CVPRW), 2020.(11pgs).
Sanford et al.,"Group Activity Detection from Trajectory and Video Data in Soccer," arXiv preprint arXiv: 2004.10299, 2020. (9pgs).
Sangüesa et al.,"Using Player's Body-Orientation to Model Pass Feasibility in Soccer," IEEE/CVF Conf. on Computer Vision & Pattern Recognition Workshops (CVPRW), 2020. (10pgs).
Cioppa et al.,"Multimodal & Multiview distillation for real-time player detection on a football field," arXiv preprint arXiv: 2004.07544, 2020. ( 10pgs).
Heilbron et al.,"ActivityNet: A Large-Scale Video Benchmark for Human Activity Understanding," IEEE Conference on Computer Vision & Pattern Recognition (CVPR), 2015. (10 pgs).
Karpathy et al.,"Large-Scale Video Classification with Convolutional Neural Networks," IEEE Conference on Computer Vision and Pattern Recognition, 2014. (8pgs).
Kuehne et al.,"HMDB: A Large Video Database for Human Motion Recognition," International Conference on Computer Vision, 2011. (8 pgs).
Abu-El-Haija et al.,"YouTube-8M: A Large-Scale Video Classification Benchmark," arXiv preprint arXiv:1609.08675, 2016. (10pgs).
Shi et al.,"ASTER: An Attentional Scene Text Recognizer with Flexible Rectification," IEEE transactions on pattern analysis and machine intelligence, 2018. (14 pgs).
Response to Non-Final Office Action filed Mar. 14, 2023, in U.S. Appl. No. 17/393,373. (15pgs).
Neimark et al.,"Video Transformer Network," arXiv preprint arXiv:2102.00719, Aug. 2021. (11pgs).
Notice of Allowance and Fee(s) Due mailed May 3, 2023, in U.S. Appl. No. 17/393,373. (5pgs).
Cioppa et al.,"Multimodal and multiview distillation for real-time player detection on a football field" In Proceedings of the IEEE/CVF Conf. on Computer Vision & Pattern Recognition (CVPR) Workshops, 2020. ( 11pgs).
Cioppa et al.,"A Context-Aware Loss Function for Action Spotting in Soccer Videos," In EEE/CVF Conference on Computer Vision & Pattern Recognition (CVPR), 2020. (11pgs).
Deliege et al.,"SoccerNet-v2 : A Dataset and Benchmarks for Holistic Understanding of Broadcast Soccer Videos," arXiv preprint arXiv:2011.13367v1, Nov. 2020. (17pgs).
Duan et al.,"Omni-sourced Webly-supervised Learning for Video Recognition," arXiv preprint arXiv:2003.13042v2, 2020. (26pgs).
Feichtenhofer et al.,"SlowFast Networks for Video Recognition," IEEE/CVF International Conference on Computer Vision (ICCV), 2019. (10pgs).
Ghadiyaram et al.,"Large-scale weakly-supervised pre-training for video action recognition," IEEE/CVF Conference on Computer Vision & Pattern Recognition (CVPR), 2019. (10pgs).
Giancola et al.,"SoccerNet: A Scalable Dataset for Action Spotting in Soccer Videos," IEEE Conference on Computer Vision & Pattern Recognition (CVPR) Workshops, 2018. (11pgs).
Giancola et al.,"Temporally-Aware Feature Pooling for Action Spotting in Soccer Broadcasts," arXiv preprint arXiv:2104.06779v1, Apr. 2021. (11pgs).
Yu et al.,"Comprehensive dataset of broadcast soccer videos," In IEEE Conf. Multimedia Inf. Process.& Retr. (MIPR), pp. 418-423, 2018.(7pgs).
S. Zhang et al.,"CityPersons: A diverse dataset for pedestrian detection," arXiv preprint arXiv:1702.05693, 2017. (12ps).
Y. Zhang et al.,"Byte-Track: Multi-object tracking by associating every detection box," arXiv preprint arXiv:2110.06864, 2021. (13pgs).
Y. Zhang et al.,"FairMOT: On the fairness of detection and re-identification in multiple object tracking," arXiv preprint arXiv:2004.01888, 2021. (19pgs).
L. Zhang et al.,"Person Re-identification in the wild," arXiv preprint arXiv:1604.02531, 2017. (10pgs).
Boiarov et al.,Large Scale Landmark Recognition via Deep Metric Learning, arXiv preprint arXiv:1908.10192, 2019. (10pgs).
E. D. Cubuk et al.,"AutoAugment: Learning Augmentation Policies from Data," arXiv preprint arXiv:1805.09501, 2019. (14 pgs).
Deng et al.,"ArcFace:Additive Angular Margin Loss for Deep Face Recognition," In IEEE/CVF Conf.Comput. Vis. & Pattern Recogn. (CVPR). Inst. Elect. & Electron. Engineers (IEEE), 2019. (10pgs).
Dosovitskiy et al.,"An Image is Worth 16×16 Words: Transformers for Image Recognition at Scale," arXiv preprint arXiv:2010.11929, 2021. (22pgs).
L. Zheng et al.,"Scalable Person Re-identification: A Benchmark," In Int. Conf. Comput. Vis. Inst. Elect. and Electron. Engineers (IEEE), 2015. (9pgs).
Z. Zhong et al.,"Random Erasing Data Augmentation," arXiv preprint arXiv: 1708.04896, 2017. (10pgs).
X. Zhou et al.,"Feature Combination Meets Attention: Baidu Soccer Embeddings and Transformer based Temporal Detection," arXiv preprint arXiv: 2106.14447, Jun. 2021. (7pgs).
Concatenate FFmpeg, Concatenating media files, [online], [Retrieved Mar. 22, 2023]. Retrieved from Internet <URL:https://trac.ffmpeg.org/wiki/Concatenate#no1>(5pgs).
Tavassolipour et al.,"Event detection and summarization in soccer videos using Bayesian network and copula," IEEE Trans.Circuits & Syst. for Video Technol., 2013. (13pgs).
Theagarajan et al.,"Soccer: Who has the ball? generating visual analytics and player statistics," In IEEE Int. Conf.Comput. Vis.& Pattern Recogn.Work. (CVPRW), 2018. (9pgs).
Tran et al.,"Automatic player detection, tracking and mapping to field modelfor broadcast soccer videos," In Int. Conf. Adv. Mob. Comput. Multimedia (MoMM), pp. 240-243. ACM Press, 2011. (4pgs).
Wang et al.,"Towards real-time multi-object tracking," arXiv preprint arXiv: 1909.12605, 2020. (17pgs).
Wen et al.,"UA-DETRAC: A new benchmark and protocol for multi-object detection and tracking," arXiv preprint arXiv: 1511.04136, 2020. (27pgs).
Xiao et al.,"Joint detection and identification feature learning for person search," arXiv preprint arXiv:1604.01850, 2017. (10pgs).
Xing et al.,"Multiple player tracking in sports video: A dual-mode twoway Bayesian inference approach with progressive observation modeling," IEEE Trans. Image Process., 20(6):1652-1667, Jun. 2010. (17pgs).
Yang et al.,"3D multiview basketball players detection and localization based on probabilistic occupancy," In Digit. Image Comp.:Tech. & Applicat, 2018.[Abstract] (4pgs).

(56) References Cited

OTHER PUBLICATIONS

Dendorfer et al.,"dendorferpatrick /MOTChallengeEvalKit," [online], [Retrieved Mar. 27, 2023]. Retrieved from Internet <URL: https://github.com/dendorferpatrick/MOTChallengeEvalKit> 2020. (1pg).
Dollar et al.,"Pedestrian Detection: A Benchmark," In IEEE Int. Conf. Comput. Vis. & Pattern Recogn. (CVPR), 2009. (8pgs).
Ess et al.,"A Mobile Vision System for Robust Multi-PersonTracking," In IEEE Int. Conf. Comput. Vis. and Pattern Recogn. (CVPR), 2008. (8pgs).
"FairMOT in PaddleDetection," [online], [Retrieved Mar. 27, 2023]. Retrieved from Internet <URL: https://github.com/PaddlePaddle/PaddleDetection/tree/release/2.3/configs/mot/fairmot> (1pg).
Fakhar et al.,"Event detection in soccer videos using unsupervised learning of spatio-temporal features based on pooled spatial pyramid model," Multimedia Tools and Applicat., 78(12):16995-17025, Jun. 2019. [Abstract Only] (15pgs).
Feng et al.,"SSET: a dataset for shot segmentation, event detection, player tracking in soccer videos," Multimedia Tools and Applicat., 79(39):28971-28992, Oct. 2020. (23pgs).
Ferryman et al.,"PETS2009: Dataset & challenge," In IEEE Int. Work. Perform. Evaluation Track. Surveill. (PETS), 2009. (8pgs).
Zhang et al.,"mixup: Beyond empirical risk minimization," arXiv preprint arXiv:1710.09412, 2017.(11 pgs).
Zisserman et al.,"The Kinetics Human Action Video Dataset," arXiv preprint arXiv:1705.06950, 2017. (22pgs).
Xin Zhou et al.,"Feature Combination Meets Attention: Baidu Soccer Embeddings and Transformer based Temporal Detection," arXiv preprint arXiv: 2106.14447, Jun. 28, 2021. (7pgs).
"SoccerNet-v2—A Dataset and Benchmarks for Holistic Understanding of Broadcast Soccer Videos," [online], [Retrieved Feb. 9, 2023]. Retrieved from Internet <URL: https://eval.ai/web/challenges/challenge-page/761/overview> (3pgs).
Deliege et al.,"SoccerNet-v2 : A Dataset and Benchmarks for Holistic Understanding of Broadcast Soccer Videos," arXiv preprint arXiv:2011.13367v3, Apr. 2021. (17pgs).
Xie et al.,"Structure analysis of soccer video with hidden markov models," IEEE International Conference on Acoustics, Speech, and Signal Processing, 2002. (4pgs).
Wang et al.,"Soccer replay detection using scene transition structure analysis," IEEE International Conference on Acoustics, Speech, and Signal Processing, 2005. (4pgs).
Andriluka et al.,"Monocular 3D Pose Estimation and Tracking by Detection," In IEEE Int. Conf. Comput. Vis. & Pattern Recogn (CVPR), 2010. (8pgs).
Anjum et al.,"CTMC: Cell tracking with mitosis detection dataset challenge," In IEEE Int. Conf. Comput. Vis. & Pattern Recogn (CVPR), 2020. (10pgs).
PaddlePaddle/PaddleDetection, object detection & instance segmentation toolkit based on PaddlePaddle, 2019 [online], [Retrieved Mar. 15, 2023]. Retrieved from Internet <URL: https://github.com/PaddlePaddle/PaddleDetection> (1 pg).
Bergmann et al.,"Tracking without bells and whistles," In IEEE Int. Conf. Comput. Vis. (ICCV) 2019. (11pgs).
Bernardin et al.,"Evaluating multiple object tracking performance: the Clear Mot metrics," EURASIP Journal on Image and Video Processing, 2008. (10pgs).
Bertini et al.,"Player identification in soccer videos," In ACM SIGMM Int. workshop on Multimedia inf. retrieval, 2005. (9pgs).
Fu et al.,"Unsupervised Pre-training for Person Reidentification," arXiv preprint arXiv: 2012.03753, 2021. (10pgs).
Hendrycks et al.,"AugMix: A Simple Data Processing Method to Improve Robustness and Uncertainty," arXiv preprint arXiv:1912.02781, 2020. (15pgs).
Huang et al.,"PP-YOLOv2:A practical object detector," arXiv preprint arXiv:2104.10419, 2021. (7pgs).
Khosla et al.,"Supervised Contrastive Learning," arXiv preprint arXiv:2004.11362, 2021. (23pgs).
Tsung-Yi Lin et al.,"Focal Loss for Dense Object Detection," arXiv preprint arXiv:1708.02002, 2018 (10pgs).
Z. Liu et al.,"Video Swin Transformer," arXiv preprint arXiv:2106.13230, Jun. 2021. (12pgs).
H. Luo et al.,"Self-Supervised Pre-Training for Transformer-Based Person Re-Identification," arXiv preprint arXiv: 2111.12084, Nov. 2021. (15pgs).
Schroff et al.,"FaceNet: A unified embedding for face recognition and clustering," arXiv preprint arXiv:1503.03832, 2015. (10pgs).
Aäron van den Oord et al.,"Representation Learning with Contrastive Predictive Coding," arXiv preprint arXiv:1807.03748, 2019. (13pgs).
Wang et al.,"Shape and Appearance Context Modeling," In Int. Conf. Comput. Vis. Inst. Elect. and Electron. Engineers (IEEE), 2007. (8pgs).
Non-Final Office Action mailed May 16, 2024, in U.S. Appl. No. 17/533,769. (7pgs).
Non-Final Office Action mailed Dec. 16, 2022, in U.S. Appl. No. 17/393,373. ( 9pgs).
Liu et al.,"Soccer video event detection using 3D convolutional networks and shot boundary detection via deep feature distance," In Int. Conf. Neural Inf. Process., vol. 10635 of Lect. Notes Comput. Sci., 2017. [Abstract] (5pgs).
Liu et al.,"Detecting and matching related objects with one proposal multiple predictions," arXiv preprint arXiv:2104.12574, 2021. (8pgs).
Lu et al.,"Learning to track and identify players from broadcast sports videos," IEEE Trans. Pattern Anal. Mach. Intell., 2013. (14pgs).
Luiten et al.,"Trackeval," [online], [Retrieved Mar. 15, 2023]. Retrieved from Internet <URL:https://github.com/JonathonLuiten/TrackEval> 2020. (1pg).
Luiten et al.,"HOTA: A higher order metric for evaluating multi-object tracking," Int. J. Comp. Vis., 129(2):548-578, Oct. 2021. (31pgs).
Luo et al.,"Multiple object tracking: A literature review," Artif. Intell., 293, Apr. 2021. (23 pgs).
Lyu et al.,"UA-DETRAC 2018: Report of AVSS2018 & IWT4S challenge on advanced traffic monitoring," In IEEE Int. Conf. Adv. Video & Signal Based Surveillance (AVSS), 2018. (6p).
Manafifard et al.,"A survey on player tracking in soccer videos," Comp. Vis. and Image Underst., 159:19-46, Jun. 2017. [Abstract] (6pgs).
Milan et al.,"MOT16: A benchmark for multi-object tracking," arXiv preprint arXiv:1603.00831, 2016. (12pgs).
Redmon et al., "You Only Look Once: Unified, Real-Time Object Detection, "In IEEE Conference on Computer Vision and Pattern Recognition (CVPR), 2016. (10pgs).
Cioppa et al.,"A Context-Aware Loss Function for Action Spotting in Soccer Videos," In EEE/CVF Conference on Computer Vision and Pattern Recognition (CVPR), 2020. (11pgs).
Feichtenhofer et al.,"SlowFast Networks for Video Recognition," In Proceedings of the IEEE international conference on computer vision (ICCV), 2019. (10pgs).
Xiao et al.,"Audiovisual SlowFast Networks for Video Recognition," arXiv preprint arXiv:2001.08740, 2020. (14pgs).
Wang et al.,"What Makes Training Multi-Modal Classification Networks Hard?," In Proceedings of the IEEE/CVF Conference on Computer Vision & Pattern Recognition, 2020. (11pgs).
Kay et al.,"The Kinetics Human Action Video Dataset," arXiv preprint arXiv: 1705.06950, 2017. (22pgs).
Giancola et al.,"SoccerNet: A Scalable Dataset for Action Spotting in Soccer Videos," IEEE/CVF Conf. on Computer Vision & Pattern Recognition Workshops (CVPRW), 2018. (11pg).
He et al.,"Deep Residual Learning for Image Recognition," In IEEE Conference on Computer Vision & Pattern Recognition (CVPR), 2016. (9pgs).
Deng et al.,"ImageNet: A Large-Scale Hierarchical Image Database," In CVPR, 2009. (9pgs).
Thomas et al.,"Computer vision for sports: Current applications and research topics," Computer Vision & Image Understanding, 2017. (34pgs).
Response filed Aug. 4, 2024, in the related matter U.S. Appl. No. 17/533,769. (16pgs).

(56) References Cited

OTHER PUBLICATIONS

Notice of Allowance and Fee(s) Due, in the related matter U.S. Appl. No. 17/533,769. (5 pgs).

* cited by examiner

600

Video Time Stamp Annotation Instructions

Watch the 1:10 (70 second) video clip and find the goal event time.
The goal event time is defined as the moment the ball crosses the goal line.
Please select either 0 (default) or 1 for the minute(') of the goal event, and record the seconds(") of the goal event. (a number between 0 and 59)
If there is no goal in a video (very rare case), select "No Goal" under "Goal?", and leave box 1 blank.
Attention: record the time stamp of the video clip, NOT the time stamp in the picture in the soccer game.
For example, if a goal event happens at "0:34" in the video clip, put number 34 in box 1. Don't put any symbols other than numbers between 0 & 59 in box 1.
The goal in video replay/slow motion does NOT count as a goal event.

Soccer Game: 1 minute 10 seconds goal clip

Team A | 0 – 0 | Team B     | 40:18

VIDEO

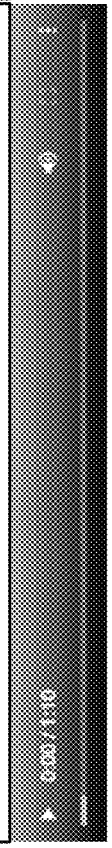

| minute (') | second (") | Goal? | Event Label |
|---|---|---|---|
| 0 ▼ | 0 ▼ | Yes ▼ | Goal event time |

For a video, parse data from game metadata (e.g., commentaries and labels) to obtain approximate timestamps (e.g., in minutes) for events of interest — 905

Using the approximate timestamps for events of interest in the video and the time mapping to generate candidate clips, in which a candidate clip includes an event of interest — 910

FIG. 9

TRANSFORMER-BASED TEMPORAL DETECTION IN VIDEO

CROSS-REFERENCE TO RELATED APPLICATIONS

This patent application is a continuation-in-part of and claims priority benefit under 35 USC § 120 to and commonly-owned U.S. patent application Ser. No. 17/393,373, filed on 3 Aug. 2021, entitled "AUTOMATICALLY AND PRECISELY GENERATING HIGHLIGHT VIDEOS WITH ARTIFICIAL INTELLIGENCE," and listing Zhiyu Cheng, Le Kang, Xin Zhou, Hao Tian, and Xing Li as inventors, which claims priority benefit under 35 USC § 119 to and commonly-owned U.S. Pat. App. No. 63/124,832, filed on 13 Dec. 2020, entitled "AUTOMATICALLY AND PRECISELY GENERATING HIGHLIGHT VIDEOS WITH ARTIFICIAL INTELLIGENCE," and listing Zhiyu Cheng, Le Kang, Xin Zhou, Hao Tian, and Xing Li as inventors; each of the aforementioned patent documents is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for automatically generating a digest or highlights of content.

B. Background

With rapidly evolving Internet technologies and emerging tools, video content, such as sports-related or other event videos, generated online is increasing at an unprecedentedly rapid pace. Especially during the COVID-19 pandemic, the number of views of online videos surged as fans were not allowed to attend events at a venue, such as a stadium or an arena. Creating highlight videos or other events-related videos often involves human efforts to manually edit the original untrimmed videos. For example, the most popular sports videos often comprise short clips of a few seconds, while for machines to understand the video and spot key events precisely is very challenging. Combined with the vast amount of original content that exists, it is very time-consuming and costly to digest the original content into appropriate highlight videos. Also, given limited time to view content, it is important for viewers to be able to have access to condensed content that appropriately captures the salient elements or events.

Accordingly, what is needed are systems and methods that can automatically and precisely generate digested or condensed video content, such as highlight videos.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 depicts a user interface embodiment designed for a person to annotate an event time for a video, according to embodiments of the present disclosure.

FIG. 9 depicts a method for generating clips from an input video, according to embodiments of the present disclosure.

DETAILED DESCRIPTION OF EMBODIMENTS

Figure 1:
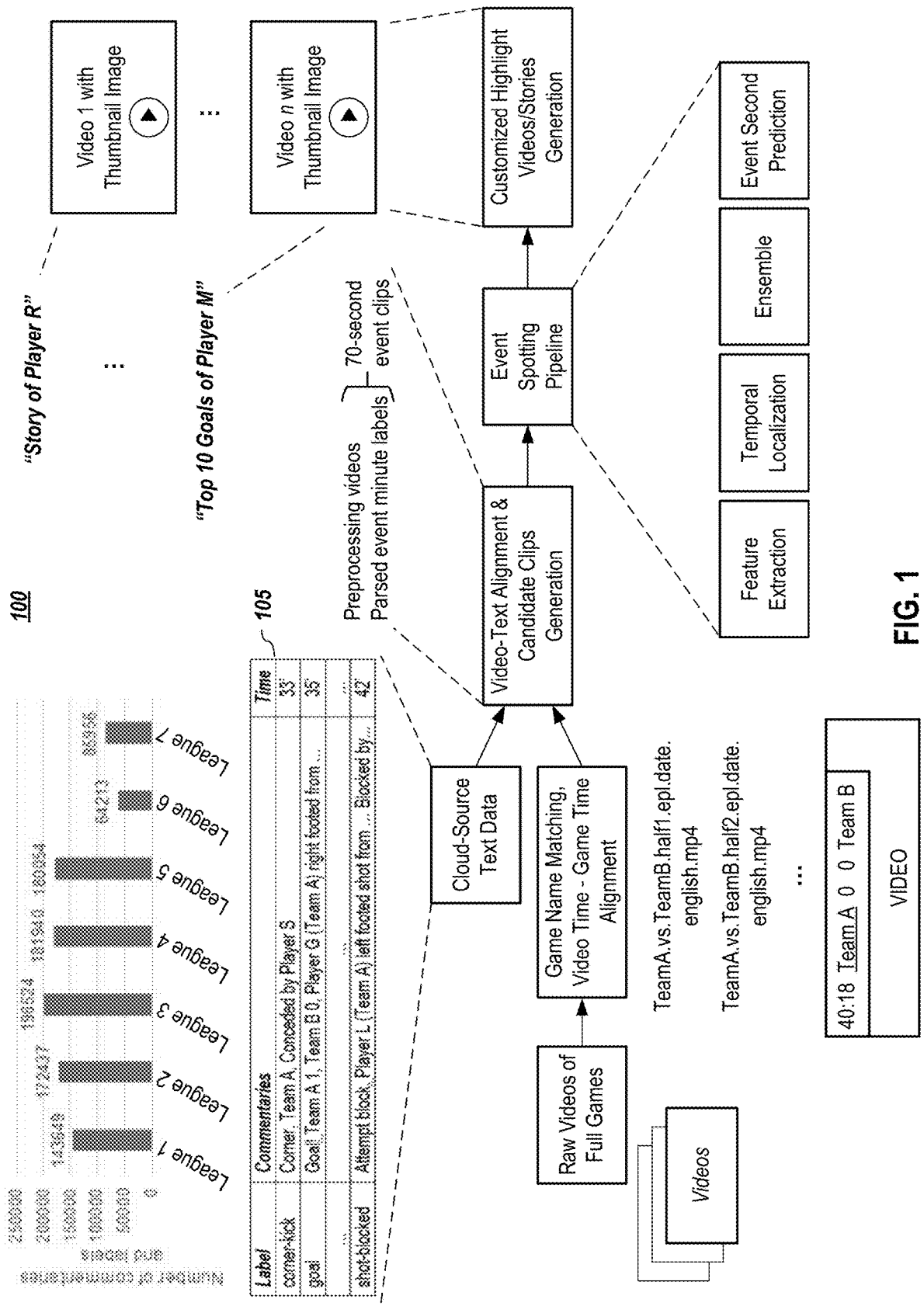
FIG. 1 depicts an overview of a highlight generation system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms, and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of sporting events, like soccer, aspects of the present disclosure are not so limited. Accordingly, the aspects of the present disclosure may be applied or adapted for use in other contexts.

A. General Introduction

1. General Overview

Presented herein are embodiments to automatically, massively, and precisely generate highlight videos. For sake of illustration, soccer games will be used. However, it shall be noted that embodiments herein may be used or adapted for use for other sports and to non-sports events, such as concerts, performances, speeches, presentations, news, shows, video games, games, sporting events, animations, social media posts, movies, etc. Each of these activities may be referred to as a happening or an event, and a highlight of a happening may be referred to as an event of interest, an occurrence, or a highlight.

Taking advantage of a large-scale multimodal dataset, state-of-the-art deep learning models were created and trained to detect an event or events in games, such as a goal—although over events of interest may also be used (e.g., penalty, injury, a fight, red card, corner kick, penalty kick, etc.). Also presented herein are embodiments of an ensemble learning module to boost the performance of event-of-interest spotting.

FIG. 1 depicts an overview of a highlight generation system, according to embodiments of the present disclosure. In one or more embodiments, large-scale cloud-sourced text data and untrimmed soccer game videos were collected and fed into a series of data processing tools to generate candidate long clips (e.g., 70 seconds—although other time lengths may be used) containing major game events of interest (e.g., a goal event). In one or more embodiments, a novel event-of-interest spotting pipeline precisely locates the moment of the event in the clip. Finally, embodiments can build one or more customized highlight videos/stories around detected highlights.

Figure 2:
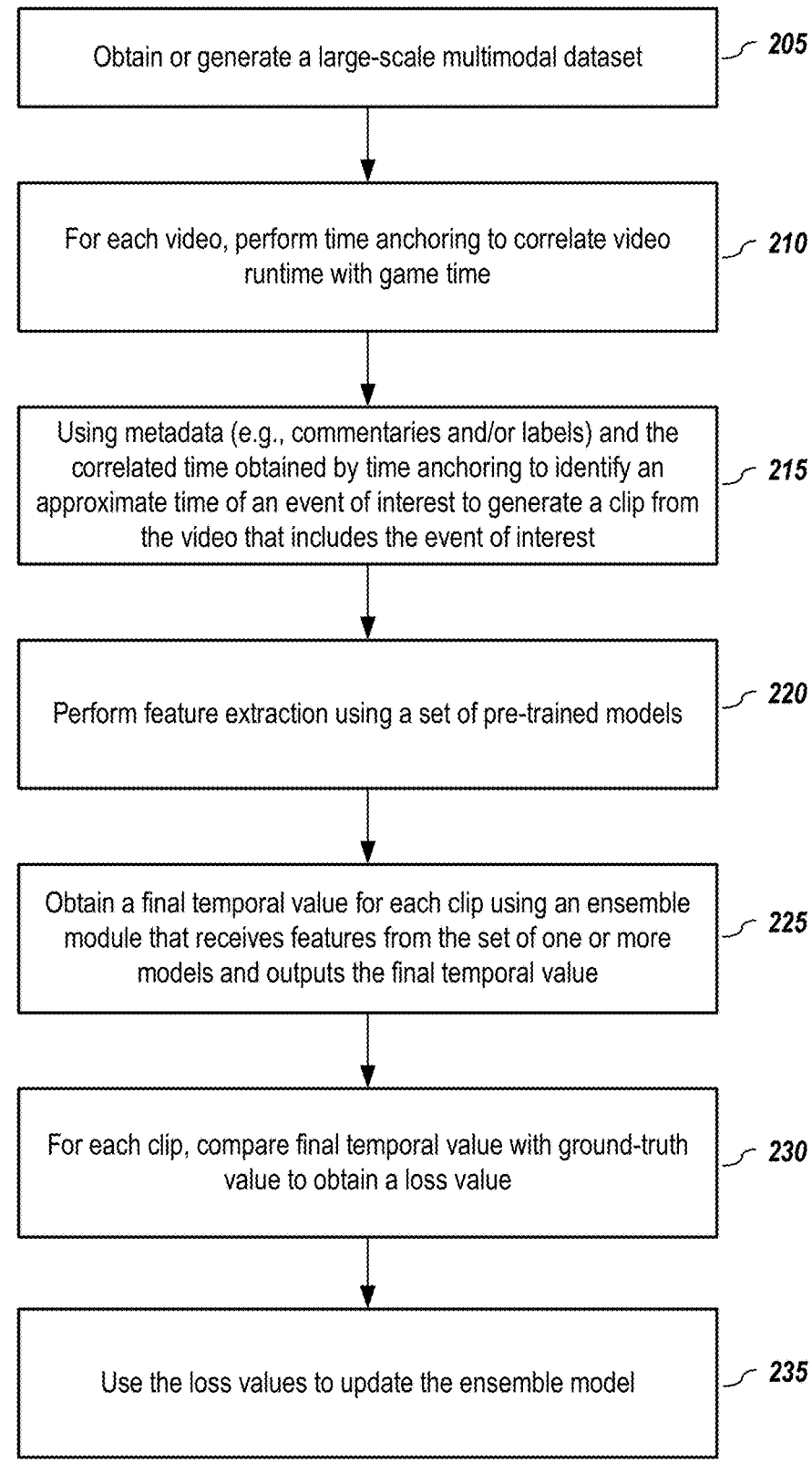
FIG. 2 depicts an overview method for training a generation system, according to embodiments of the present disclosure.

FIG. 2 depicts an overview method for training a generation system, according to embodiments of the present disclosure. To train a generation system, a large-scale multimodal dataset of event-related data must be obtained or generated (205) so that it can be used as training data. Because a video runtime may not correspond to the time in the event, in one or more embodiments, for each video of a set of training videos, time anchoring is performed (210) in order to correlate video runtime with event time. Metadata (e.g., commentaries and/or labels) and the correlated time obtained by time anchoring may then be used to identify (215) an approximate time of an event of interest to generate a clip from the video that includes the event of interest. By using clips rather than the entire video, the processing requirements are greatly reduced. For each clip, features are extracted (220). In one or more embodiments, a set of pre-trained models may be used to obtain the extracted features, which may be multimodal.

In one or more embodiments, for each clip, a final temporal value of the event of interest is obtained (225) using a neural network model. The neural network model may, in embodiments, be an ensemble module that receives features from the set of models and outputs the final temporal value. Given the predicted, final temporal value for each clip, the predicted, final temporal value is compared (230) with its corresponding ground-truth value to obtain a loss value; and the loss values may be used to update (235) the model.

Once trained, the generation system may be output and used to generate highlight video(s) given an input event video.

2. Related Work

In recent years, artificial intelligence has been applied to analyze video content and generate videos. In sports analytics, many computer vision technologies are developed to understand sports broadcasts. Specifically, in soccer, researchers propose algorithms to identify key game events and player actions, analyze pass feasibility using player's body orientation, incorporate both audio and video streams to detect events, recognize group activities on the field using broadcast stream and trajectory data, aggregate deep frame features to spot major game events, and leverage the temporal context information around the actions to handle the intrinsic temporal patterns representing these actions.

Deep neural networks are trained with large-scale datasets for various video understanding tasks. Recent challenges include finding temporal boundaries of activities or localizing the events in the temporal domain. In soccer video understanding, some have defined the goal event as the moment that the ball crosses the goal line.

In one or more embodiments, this definition of a goal is adopted and state-of-the-art deep learning models and methods are leveraged, as well as audio stream processing techniques, plus an ensemble learning module is employed in embodiments to spot precisely the event in soccer video clips.

3. Some Contributions of Embodiments

In this patent document, embodiments of an automatic highlight generation system that can precisely identify an event occurrence in videos are presented. In one or more embodiments, the system may be used to generate highlight videos massively without conventional human editing efforts. Some of the contributions provided by one or more embodiments include, but are not limited to, the following:

- A large-scale multimodal soccer dataset, which includes cloud-sourced text data, high-definition videos, was created. And, in one or more embodiments, various data processing mechanisms were applied to parse, clean, and annotate the collected data.
- Multimodal data from multiple sources was aligned, and candidate long video clips were generated by cutting the raw videos into 70-second clips using parsed labels from cloud-sourced commentary data.
- Embodiments of an event spotting pipeline are presented herein. Embodiments extract advanced feature representations from multiple perspectives, and temporal localization methods are applied to aid in spotting the event in the clips. Additionally, embodiments were further designed with an ensemble learning module to boost the performance of the event spotting. It shall be noted that while the happening may be a soccer game and the event-of-interest may be a goal, embodiments may be used for or adapted for other happenings and other events-of-interest.
- The experimental results show that the tested embodiments achieve close to 1 accuracy (0.984) with a tolerance of 5 seconds in spotting the goal event in clips, which outperforms existing work and establishes the new state-of-the-art. This result helps to catch the exact goal moment and generate highlight videos precisely.

4. Patent Document Layout

This patent document is organized as follows: Section B introduces the dataset that was created and how the data was collected and annotated. Embodiments of the methodology for building a highlight generation system embodiment and how to precisely spot the goal event in soccer video clips with the proposed methodologies are presented in Section C. Experimental results are summarized and discussed in Section D. Section E presents some additional or alternative embodiments and some experimental results. It shall be reiterated that the use of a soccer game as the overall content and the goal as the event within that content is provided by way of illustration only, and one skilled in the art shall recognize that aspects herein may be applied to other content domains, including outside of the gaming domain, and to other events.

B. Data Processing Embodiments

Figure 3:
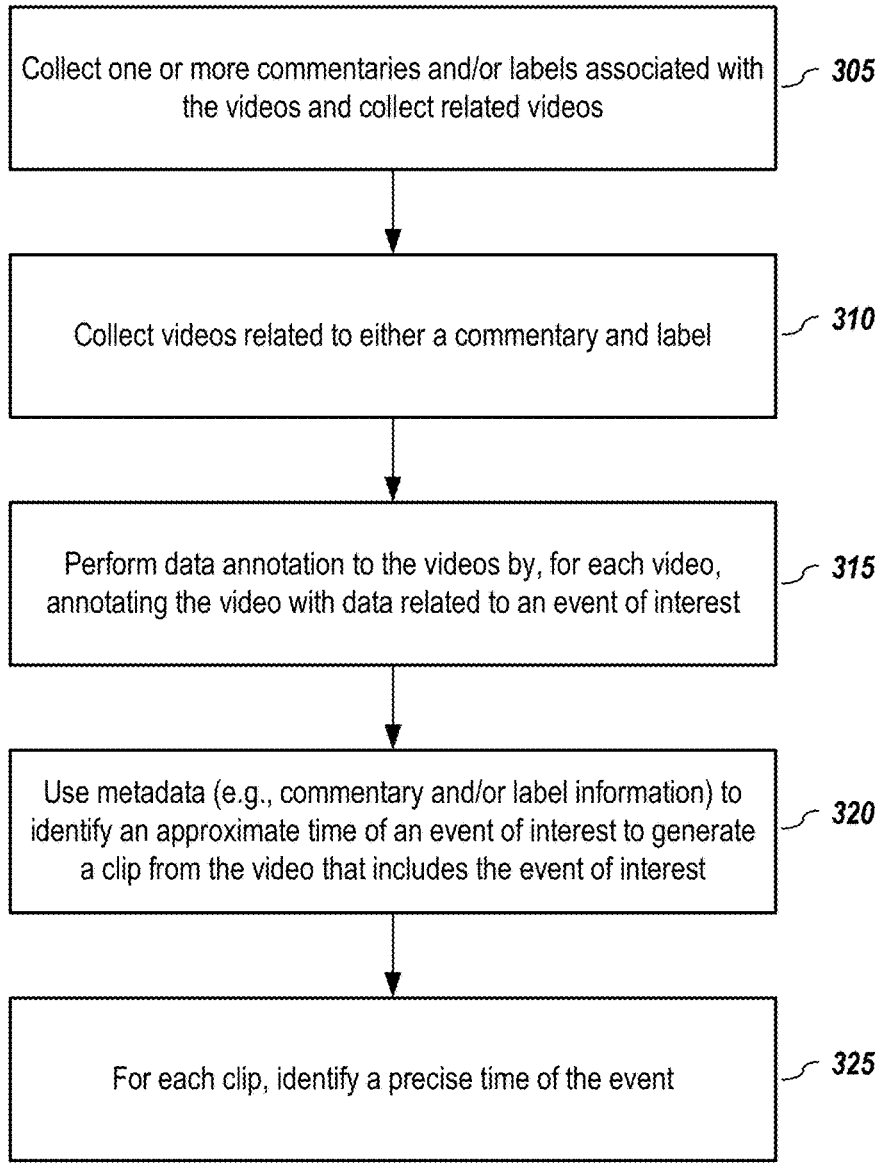
FIG. 3 depicts a general overview of the dataset generation process, according to embodiments of the present disclosure.

To train and develop system embodiments, a large-scale multimodal dataset was created. FIG. 3 depicts a general overview of the dataset generation process, according to embodiments of the present disclosure. In one or more embodiments, one or more commentaries and/or labels associated with videos of the event are collected (305). For example, soccer game commentaries and labels (e.g., corner kick, goal, block shot, header, etc.) (see, e.g., labels and commentaries 105 in FIG. 1) from websites or other sources may be crawled to obtain data. Also, videos associated with the metadata (i.e., commentaries and/or labels) are also collected (305). For embodiments herein, high-definition (HD) untrimmed soccer game videos from various sources were collected. Amazon Mechanical Turk (AMT) was used to annotate (315) the game start time in untrimmed raw videos. In one or more embodiments, the metadata (e.g., commentary and/or label information) may be used (320) to help identify an approximate time of an event of interest to generate a clip from the video that includes the event of interest (e.g., a clip of a goal). Finally, Amazon Mechanical Turk (AMT) was used to identify a precise time of the event of interest (e.g., a goal) in the processed video clips. The annotated goal time may be used as the ground truth during the training of embodiments of the goal spotting models.

1. Data Collection Embodiments

Figure 4:
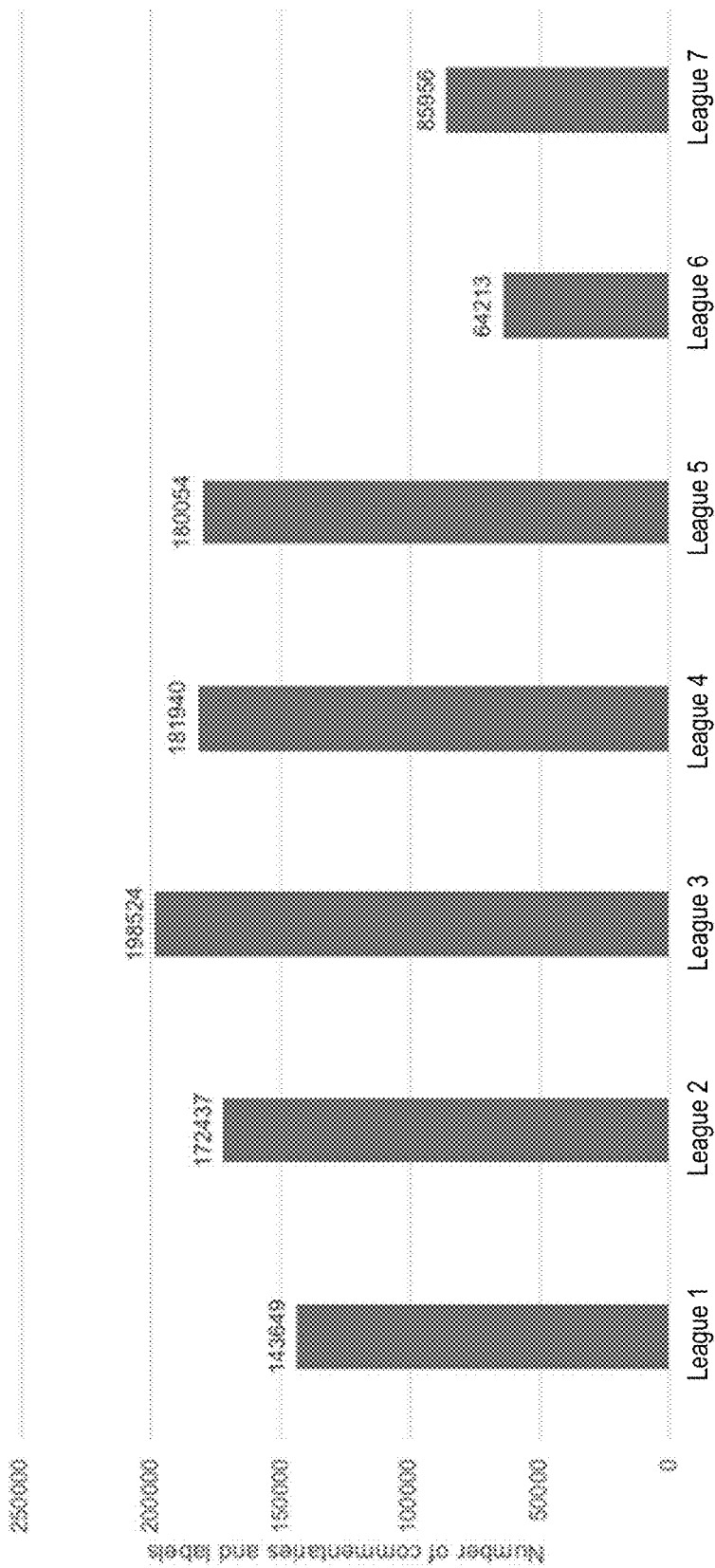
FIG. 4 summarizes some of cloud-sourced text data of commentaries and labels, according to embodiments of the present disclosure.

In one or more embodiments, sports websites were crawled for more than 1,000,000 commentaries and labels, which cover more than 10,000 soccer games from various leagues, dated from 2015 to 2020 seasons. FIG. 4 summarizes some of cloud-sourced text data of commentaries and labels, according to embodiments of the present disclosure.

The commentaries and labels provide a large amount of information for each game. For example, they include game date, team names, leagues, game events time (in minutes), event labels such as goal, shot, corner, substitution, foul, etc., and associated player names. These commentaries and labels from cloud-sourced data may be translated into or may be considered as rich metadata for raw video processing embodiments, as well as highlight video generation embodiments.

Figure 5:
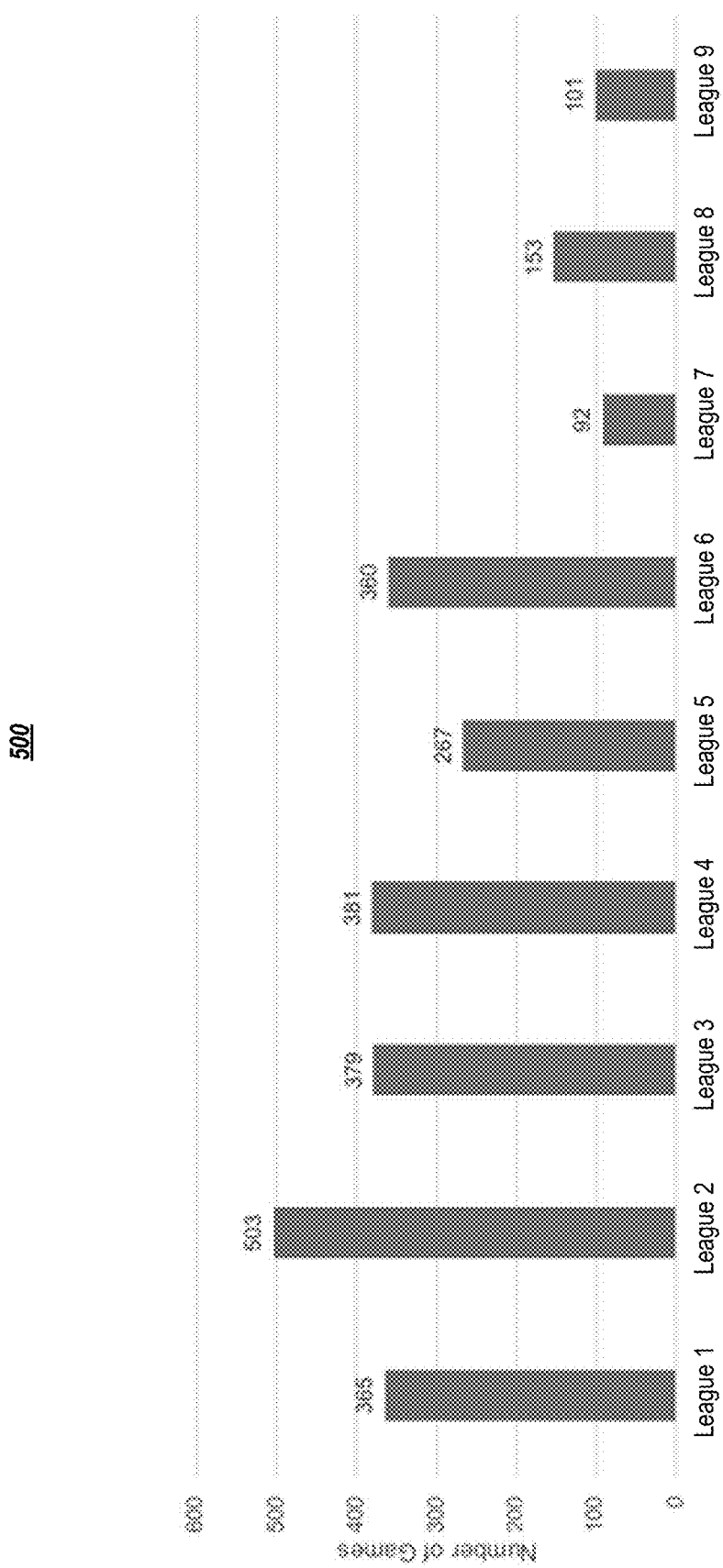
FIG. 5 summarizes collected untrimmed game videos, according to embodiments of the present disclosure.

Also collected were more than 2600 high-definition (720P or above) untrimmed soccer game videos from various online sources. The games come from various leagues, dated from 2014 to 2020. FIG. 5 summarizes collected untrimmed game videos, according to embodiments of the present disclosure.

2. Data Annotation Embodiments

In one or more embodiments, the untrimmed raw videos were first sent to the Amazon Mechanical Turk (AMT) workers to annotate the game start time (defined as the moment when the referee whistles to start the game), then the cloud-sourced game commentaries and labels were parsed to get the goal time in minutes for each game. By combining the goal minute labels and the game start times in the videos, candidate 70-second clips containing goal events were generated. Next, in one or more embodiments, these candidate clips were sent to the AMT for annotating the goal time in second. FIG. 6 depicts a user interface embodiment designed for AMT for goal time annotation, according to embodiments of the present disclosure.

For goal time annotation on AMT, each HIT (Human Intelligence Task, a single worker assignment) contained one (1) candidate clip. Each HIT was assigned to five (5) AMT workers, and the median timestamp value was collected as the ground truth label.

C. Methodology Embodiments

In this section, the details of embodiments of each of the highlighted generation system's five modules are presented. By way of brief overview, the first module embodiments in section C.1 are the game time anchoring embodiments, which examine the temporal integrity of the video and map any time in the game to time in the video.

The second module embodiments in section C.2 are the coarse interval extraction embodiments. This module is a major difference compared to commonly studied event spotting pipelines. In embodiments of this module, intervals of 70 seconds (although other size intervals may be used) are extracted, where a specific event is located by utilizing textual metadata. There are at least three reasons this approach is preferred compared to common end-to-end visual event spotting pipelines. First, clips extracted with metadata contain more context information and can be useful across different dimensions. With the metadata, the clips may be used as a temporal cut (such as game highlight videos) or may be used with other clips for the same team or player to generate team, player, and/or season highlight videos. The second reason is robustness, which comes from low event ambiguity of textual data. And third, by analyzing shorter clips for the event of interest rather than the entire video, many resources (processing, processing time, memory, energy consumption, etc.) are preserved.

Embodiments of the third module in system embodiments are the multimodal features extraction. Video features are extracted from multiple perspectives.

Embodiments of the fourth module are the precise temporal localization. Extensive studies of the technicalities of how embodiments of features extraction and temporal localization were designed and implemented are provided in sections C.3 and C.4, respectively.

Finally, embodiments of an ensemble learning module are described in section C.5.

1. Game Time Anchoring Embodiments

It was found that the event clocks in the event videos were sometimes irregular. The primary reason appeared to be that at least some of the event video files that were collected from the Internet contained damaged timestamps or frames. It was observed that in the video collections, about 10% of the video files contained temporal damages that temporally shift part of the video—sometimes by over 10 seconds. Some severe damages that were observed included over 100 seconds of missing frames. Besides errors in the video files, some unexpectedly rare events may have happened during the happening/event, and the event clocks have to stop for a few minutes before they resume. Be it video content damage or game interruption, temporal irregularities may be viewed as temporal jumps, either forward or backward. To locate the clip of any event specified by the metadata precisely, in one or more embodiments, temporal jumps were detected, and calibrations were made accordingly. Therefore, in one or more embodiments, an anchoring mechanism was designed and used.

Figure 7:
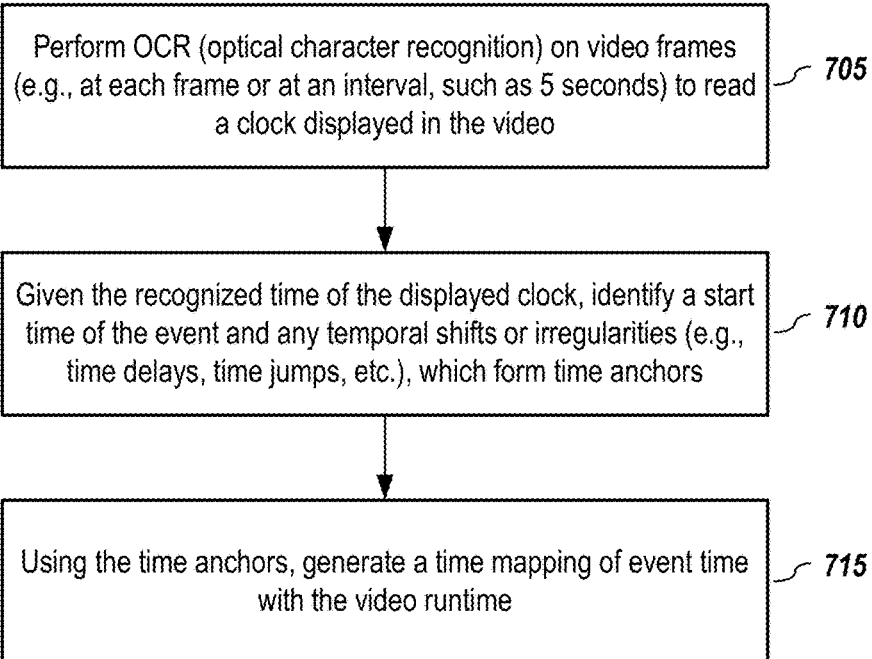
FIG. 7 depicts a method for event time and video runtime correlating, according to embodiments of the present disclosure.
Figure 8:
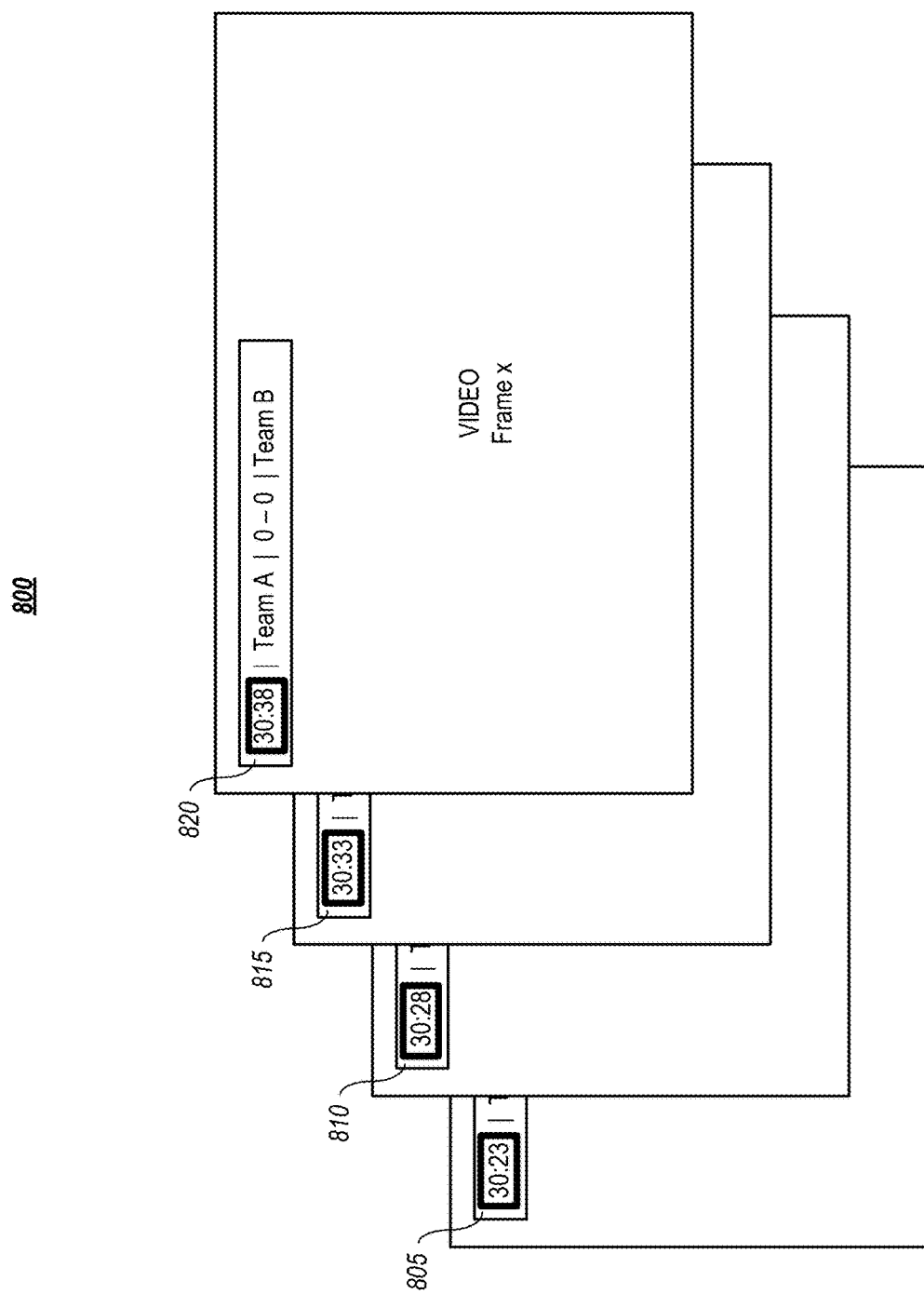
FIG. 8 visualizes an example of recognizing the timer digits in a game video, according to embodiments of the present disclosure.

FIG. 7 depicts a method for event time and video runtime correlating, according to embodiments of the present disclosure. In one or more embodiments, OCR (optical character recognition) was performed (705) on the video frames at the interval of 5 seconds (but other intervals may be used) to read the game clock displayed in the video. The game start time in the video may be deduced (710) from the recognized game clock. Whenever a temporal jump occurred, in one or more embodiments, a record of the game time after the temporal jump was kept (710), and it was called or referred to as a time anchor. With time anchors, in one or more embodiments, any time in the game may be mapped (715) to time in the video (i.e., video runtime), and any clips specified by metadata may be precisely extracted. FIG. 8 visualizes an example of recognizing the timer digits in a game video, according to embodiments of the present disclosure.

As illustrated in FIG. 8, the timer digits 805-820 may be recognized and correlated to the video runtime. Embodiments may collect multiple recognition results over time and may self-correct based on spatial stationarity and temporal continuity.

2. Coarse Interval Extraction Embodiments

FIG. 9 depicts a method for generating clips from an input video, according to embodiments of the present disclosure. In one or more embodiments, metadata from the cloud-sourced game commentaries and labels, which include the timestamps in minutes for the goal events, is parsed (905). Combined with the game start times detected by an embodiment of the OCR tool (discussed above), the raw videos may be edited to generate x-second (e.g., 70 seconds) candidate clips containing an event of interest. In one or more embodiments, the extracting rule may be described by the following equations:

$$t_{\{clipStart\}} = t_{\{gameStart\}} + 60 * t_{\{goalMinute\}} - \text{tolerance} \quad (1)$$

$$t_{\{clipEnd\}} = t_{\{clipStart\}} + (\text{base clip length} + 2*\text{tolerance}) \quad (1)$$

In one or more embodiments, given the goal minute $t_{\{goalMinute\}}$ and the game start time $t_{\{gameStart\}}$, clips from the $t_{\{clipStart\}}$ second in the video are extracted. In one or more embodiments, the duration of the candidate clips may be set to 70 seconds (in which the base clip length is 60 seconds and the tolerance is 5 seconds—although it should be noted that different values and different formulations may be used) because this covers the corner cases when the event of interest occurred very close to the goal minute, and it also tolerates small deviations of the OCR detected game start time. In the next section, method embodiments for spotting the goal second (the moment the ball crosses the goal line) in the candidate clips are presented.

3. Multimodal Features Extraction Embodiments

In this section, three embodiments to obtain advanced feature representations from the candidate clips are disclosed.

a) Feature Extraction with Pre-Trained Models Embodiments

Figure 10:
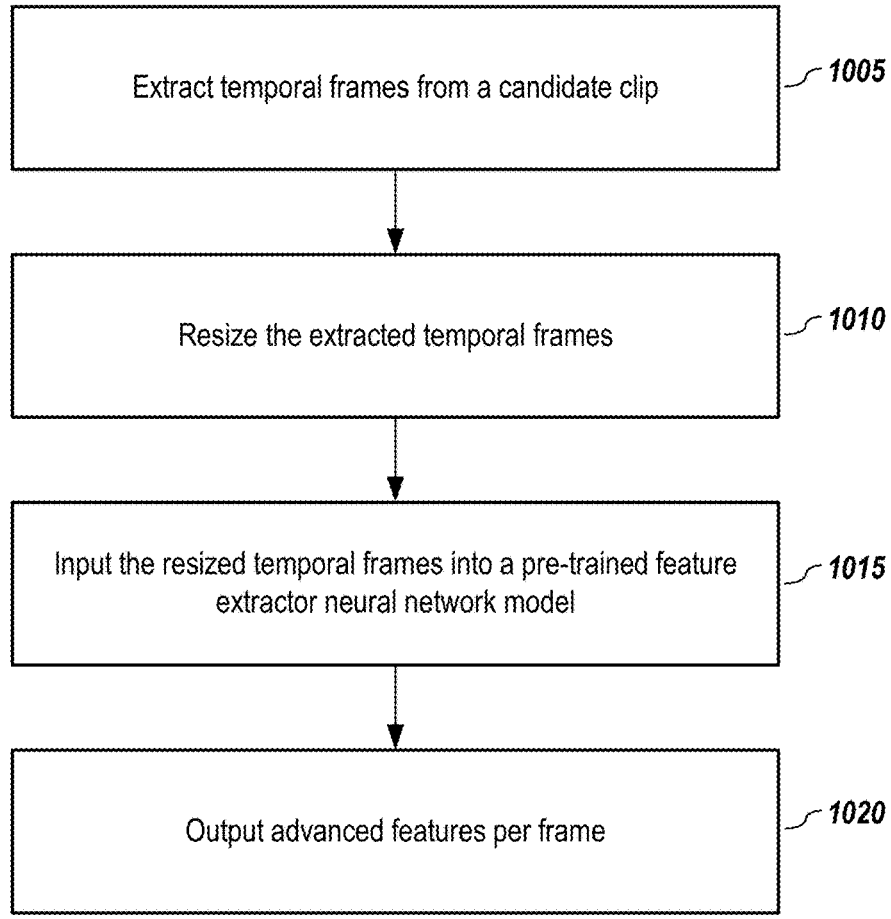
FIG. 10 depicts feature extraction, according to embodiments of the present disclosure.
Figure 11:
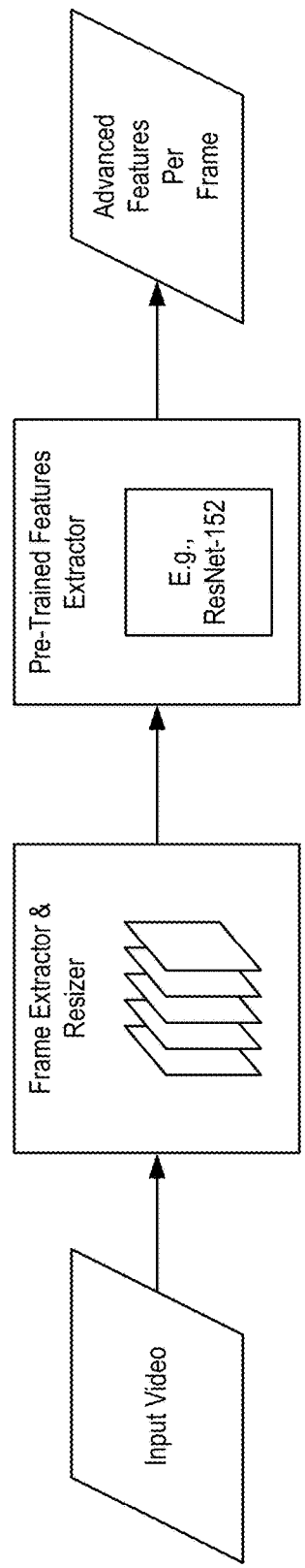
FIG. 11 shows a pipeline to extract features, according to embodiments of the present disclosure.

FIG. 10 depicts feature extraction, according to embodiments of the present disclosure. Given the video data, in one or more embodiments, the temporal frames are extracted (1005) and resized (1010) in the spatial domain, if needed to match in the input size, to feed a deep neural network model to obtain the advanced feature representations. In one or more embodiments, a ResNet-152 model pretrained on an image dataset is used, but other networks may be used. In one or more embodiments, the temporal frames are extracted at the inherent frame per second (fps) of the original video and then down sampled at 2 fps—i.e., ResNet-152 feature representations for 2 frames per second in the raw video are obtained. ResNet is a very deep neural network, which outputs a feature representation of 2048 dimensions per frame at the fully-connected-1000 layer. In one or more embodiments, the output of the layer before the softmax layer may be used as the extracted advanced features. Note the ResNet-152 may be used to extract advanced features from single images; it does not intrinsically embed temporal context information. FIG. 11 shows a pipeline 1100 to extract advanced features, according to embodiments of the present disclosure.

b) Slowfast Feature Extractor Embodiments

Figure 12:
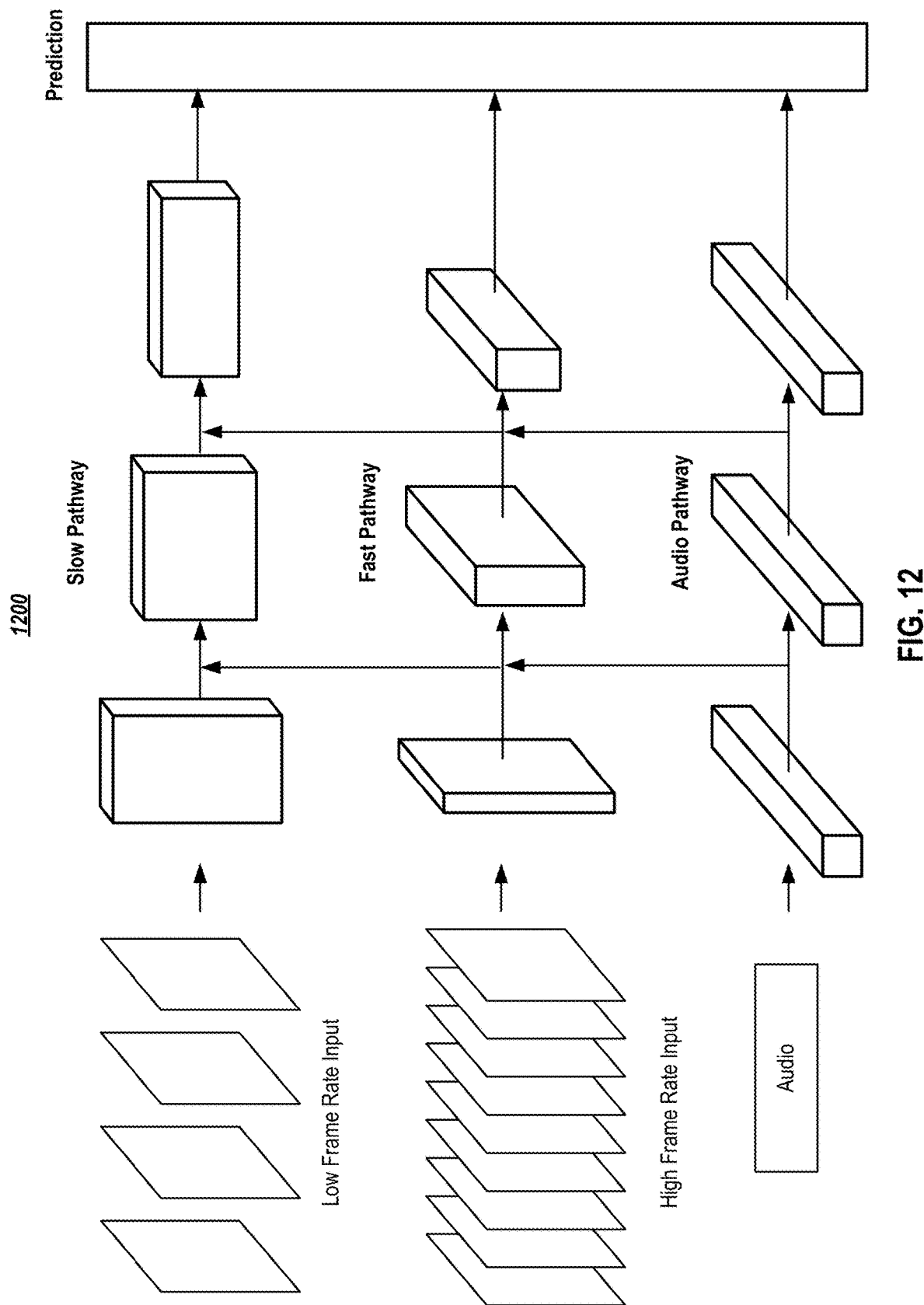
FIG. 12 graphically depicts a neural network model that may be used to extract features, according to embodiments of the present disclosure.

As part of the video features extractor, in one or more embodiments, a Slowfast network architecture—such as like that proposed by Feichtenhofer et al. (Feichtenhofer, C., Fan, H., Malik, J., & He, K., Slowfast Networks for Video Recognition, In *Proceedings Of The IEEE International Conference On Computer Vision* (pp. 6202-6211) (2019), which is incorporated by reference herein in its entirety) or by Xiao et al. (Xiao et al., Audiovisual SlowFast Networks for Video Recognition, available at arxiv.org/abs/2001.08740v1 (2020), which is incorporated by reference herein in its entirety)—may be used; although it shall be noted that other network architectures may be used. FIG. 12 graphically depicts a neural network model that may be used to extract features, according to embodiments of the present disclosure.

Figure 13:
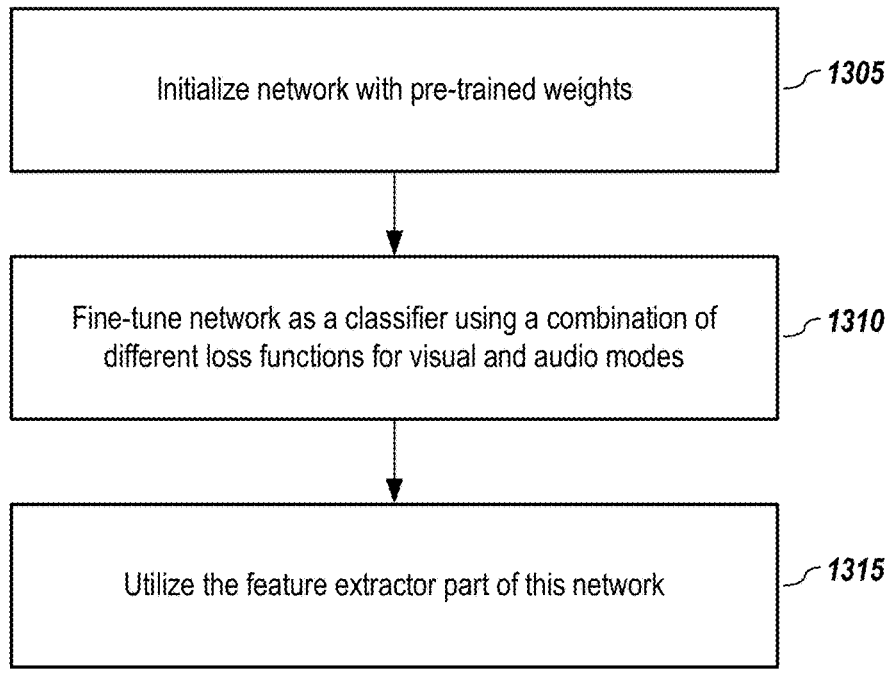
FIG. 13 depicts feature extraction using a Slowfast neural network model, according to embodiments of the present disclosure.

FIG. 13 depicts feature extraction using a Slowfast neural network model, according to embodiments of the present disclosure. In one or more embodiments, a Slowfast network is initialized (1305) with pre-trained weights using a training dataset. The network may be finetuned (1310) as a classifier. The second column in Table 1, below, shows the events classification results using the baseline network with a test data set. In one or more embodiments, the feature extractors are used to classify 4-second clips into 4 categories: 1) far from the event of interest (e.g., a goal), 2) just before the event of interest, 3) the event of interest, and 4) just after the event of interest.

Several techniques may be implemented to find the best classifier, which is evaluated by the top 1 error percentage. First, a network like that constructed in FIG. 12 is applied, which adds audio as an extra pathway to the Slowfast network (AVSlowfast). The network's visual part may be initialized with the same weights. One can see that direct joint training of visual and audio features actually hurts the performance. This is discovered as a common issue when training the multimodal networks. In one or more embodiments, a technique of adding different loss functions for visual and audio modes respectively was applied, and the whole network was trained with a multi-task loss. In one or more embodiments, a linear combination of cross-entropy losses on the audio-visual result and each of the audio and visual branches may be used. The linear combination may be a weighted combination in which the weights may be learned or may be selected as hyperparameters. The best top 1 error results shown in the bottom row in Table 1 were obtained.

TABLE 1

Results on event classification.

| Algorithms | Top 1 error % |
|---|---|
| Slowfast | 33.27 |
| Audio only | 60.01 |
| AVSlowfast | 40.84 |
| AVSlowfast multi-task | 31.82 |

In one or more embodiments of the goal spotting pipeline, one may take advantage of the feature extractor part of this network (AVSlowfast with multi-task loss). Therefore, an aim is to lower the top 1 error, which corresponds to stronger features.

c) Mean-Abs Audio Feature Embodiments

By listening to the soundtrack of an event (e.g., a game play without live commentary), people can often decide when an event of interest has occurred simply according to the volume of the audience. Inspired by this observation, a simple approach to extract the key information about events of interest from the audios directly was developed.

Figure 14:
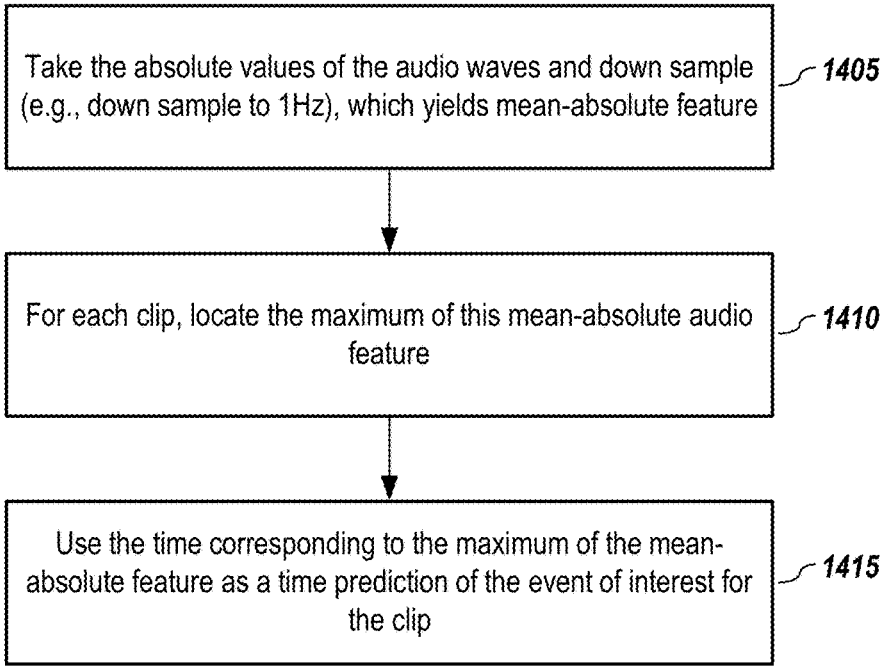
FIG. 14 depicts a method for audio feature extraction and event of interest time prediction, according to embodiments of the present disclosure.
Figure 15A:
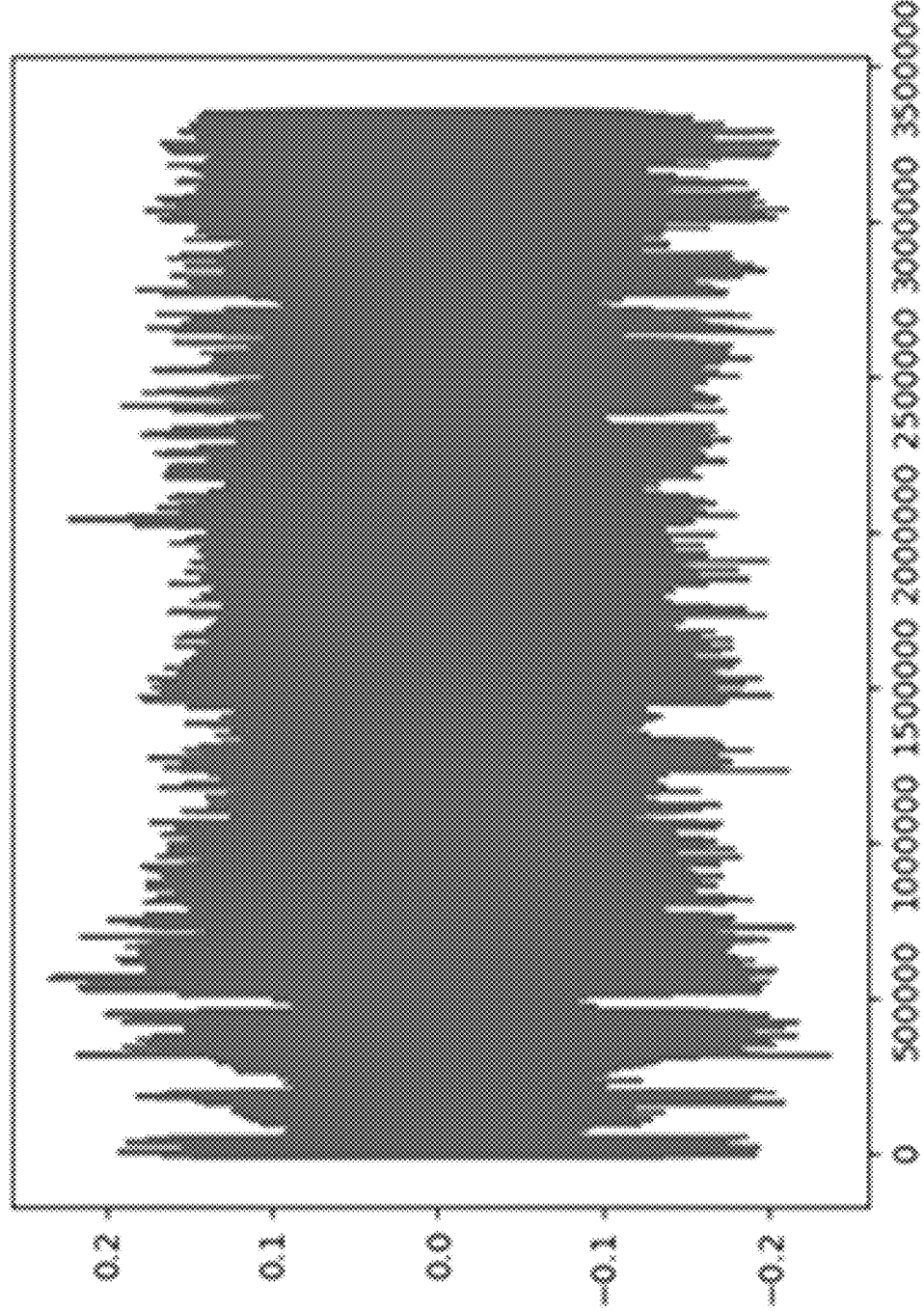
FIG. 15A shows an example of a raw audio wave.
Figure 15B:
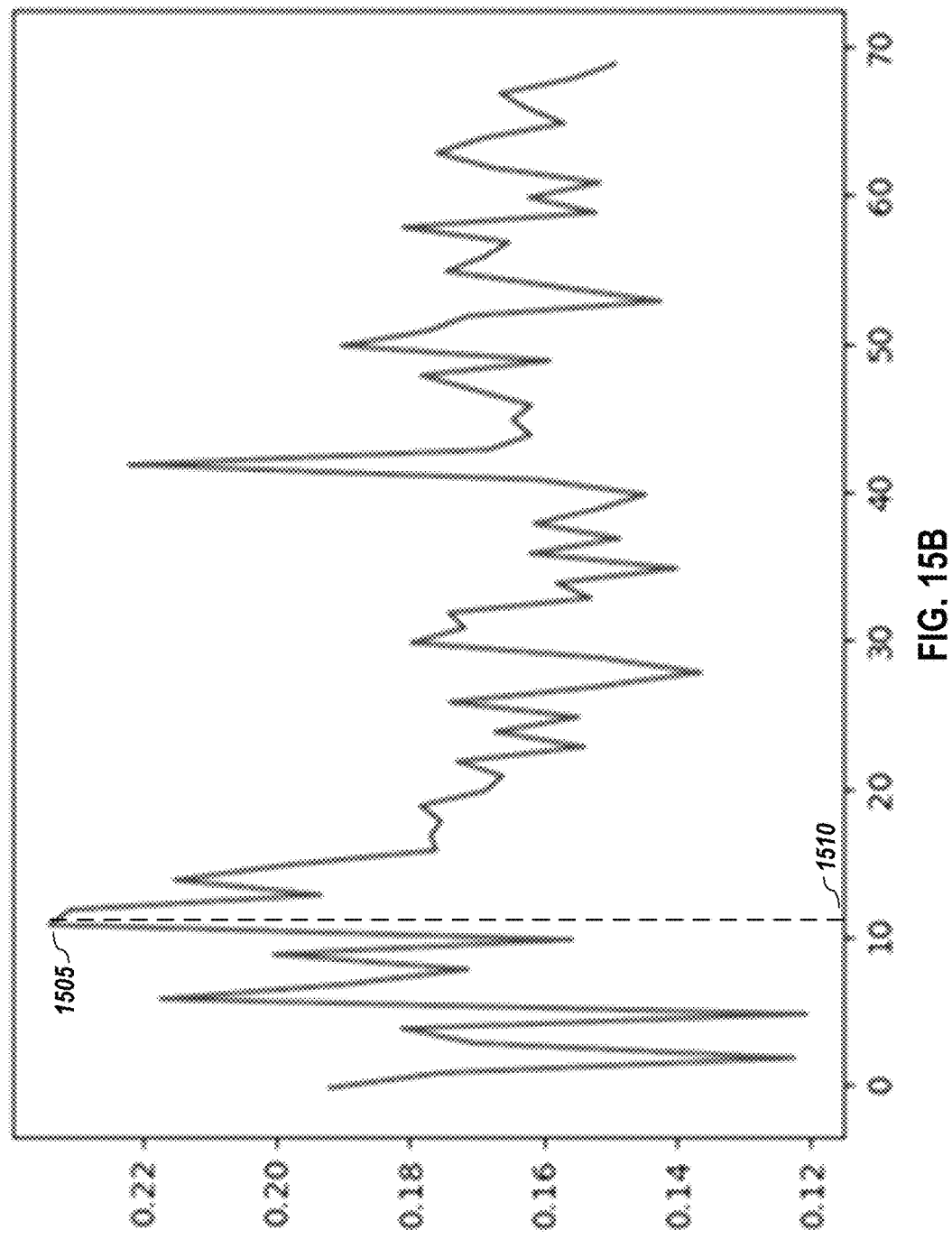
FIG. 15B shows its corresponding mean-abs feature, according to embodiments of the present disclosure.

FIG. 14 depicts a method for audio feature extraction and event of interest time prediction, according to embodiments of the present disclosure. In one or more embodiments, the absolute values of the audio waves are taken and down sample (1405) to 1 Hertz (Hz). This feature representation may be referred to as the mean-abs feature, as it represents the mean sound amplitude at each second. FIGS. 15A & 15B show an example of one clip's raw audio wave and its mean-abs feature, respectively, according to embodiments of the present disclosure.

For each clip, the maximum 1505 of this mean-absolute audio feature 1500B may be located (1410). By locating the maximum (e.g., maximum 1505) of this mean-abs audio feature and its corresponding time (e.g., time 1510) for clips in the test data set, a 79% accuracy (under 5 seconds tolerance) in event temporal localization was achieved.

In one or more embodiments, the mean-absolute audio feature (e.g., 1500B in FIG. 15B) may be treated as a likelihood prediction of the event of interest for the times in the clip. As will be discussed below, this mean-absolute audio feature may be a feature input into an ensemble model that predicts a final time within the clip of the occurrence of the event of interest.

4. Action Spotting Embodiments

To precisely spot the moment of a goal in soccer game videos, in one or more embodiments, temporal context information around the moment is incorporated to learn what happened in the videos. For example, before a goal event occurs, the goal player will shoot the ball (or a header) and the ball will move towards the goal gate. In some scenarios, the attacking and defensive players are gathered in the penalty area and are not far from the goal gate. After the goal event, usually the goal player will run to the sideline, hug with teammates, and there will also be celebrating by the spectators and among the coaches. Intuitively, these patterns in the video can help the model to learn what happened and spot the moment of the goal event.

Figure 16:
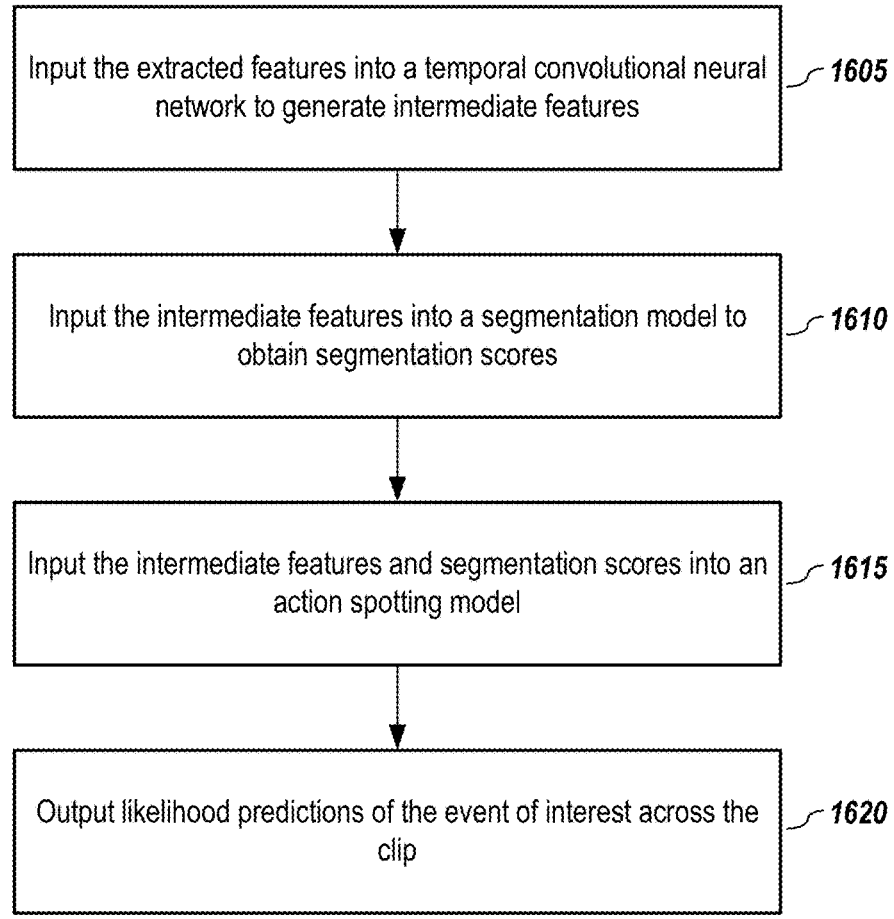
FIG. 16 depicts a method for predicting the time of an event of interest in a video, according to embodiments of the present disclosure.

FIG. 16 depicts a method for predicting likelihood of an event of interest in a video clip, according to embodiments of the present disclosure. In one or more embodiments, to construct a temporal localization model, a temporal convolution neural network, which takes the extracted visual features as the input, is used (1605). In one or more embodiments, the input features may be the extracted features from one or more of the prior models discussed above. For each frame, it outputs a set of intermediate features, which mixes temporal information across the frames. Then, in one or more embodiments, the intermediate features are input (1610) into a segmentation module that generates segmentation scores, which are assessed by a segmentation loss function. A cross-entropy loss function may be used for a segmentation loss function:

$$L = -\sum_{i=1}^{n} t_i \log(p_i)$$

where $t_i$ is the ground truth label, and $p_i$ is the softmax probability for the ith class.

In one or more embodiments, the segmentation scores and the intermediate features are concatenated and fed (1615) into an action spotting module, which generates (1620) the spotting predictions (e.g., likelihood predictions across the span of the clip of the event of interest occurring at each time instant), which may be assessed through a YOLO-like action spotting loss function. An L2 loss function may be used for an action spotting loss function:

$$L = \sum_{i=1}^{n} (y_{true} - y_{predicted})^2$$

Figure 17:
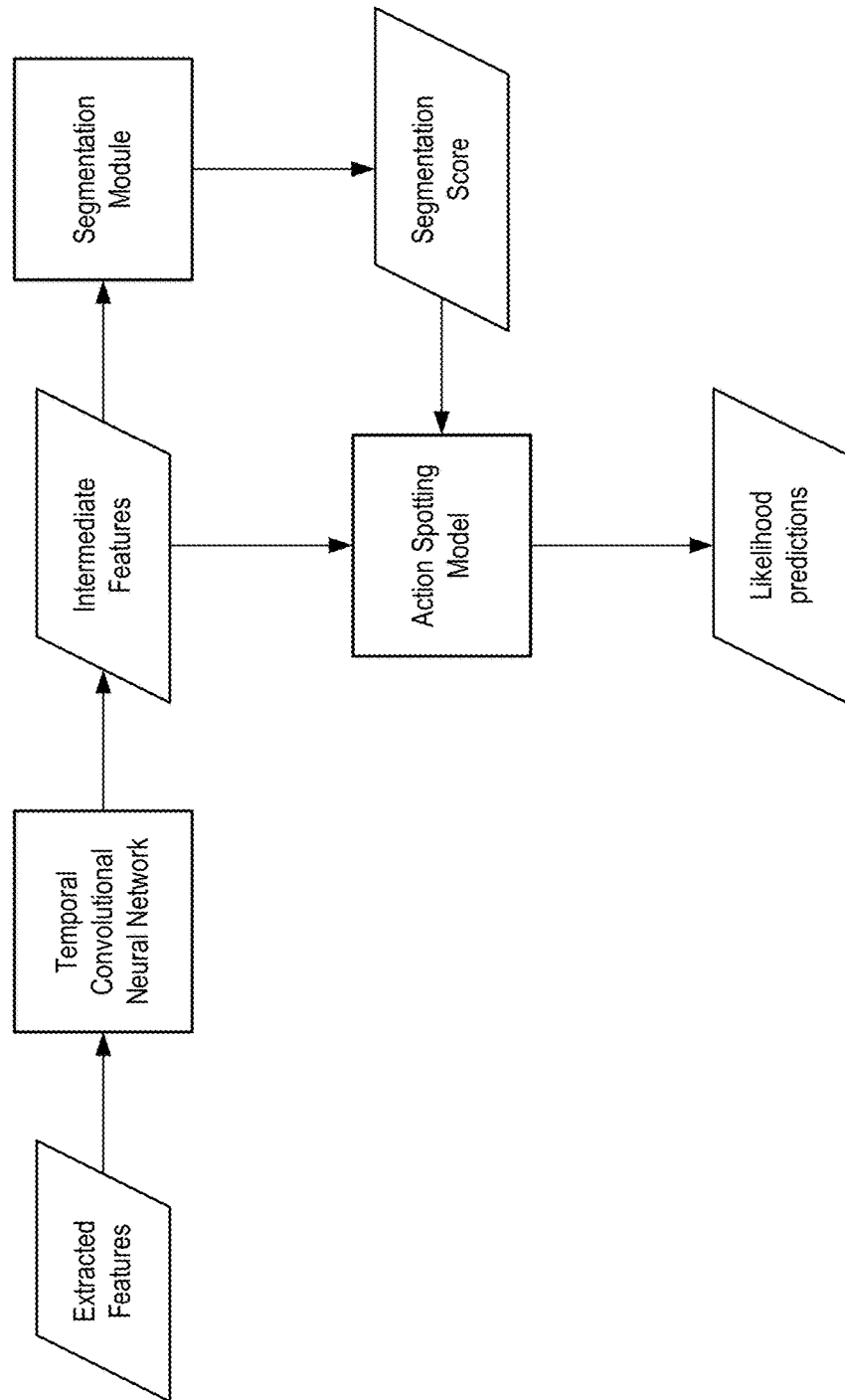
FIG. 17 illustrates a pipeline for temporal localization, according to embodiments of the present disclosure.

FIG. 17 illustrates a pipeline for temporal localization, according to embodiments of the present disclosure. In one or more embodiments, the temporal CNN may comprise convolution layers, the segmentation module may comprise convolutional layers and batch normalization layers, and the action spotting model may comprise pooling layers and convolutional layers.

In one or more embodiments, the model embodiment is trained with the segmentation and action spotting loss function as described by Cioppa et al. (A., Deliège, A., Giancola, S., Ghanem, B., Droogenbroeck, M. V., Gade, R., & Moeslund, T. in "A Context-Aware Loss Function for Action Spotting in Soccer Videos," 2020 *IEEE/CVF Conference on Computer Vision and Pattern Recognition (CVPR)*, 13123-13133, which is incorporated by reference herein in its entirety) considering the temporal context information. In one or more embodiments, segmentation loss is used to train the segmentation module, where each frame is associated with a score to represent how likely the frame belongs to an action class, while the action spotting loss is used to train the action spotting module, where a temporal location is predicted for an action class.

At least one of the major differences between embodiments herein and the approach of Cioppa et al. is that embodiments herein deal with short clips, while Cioppa et al. take the entire game videos as the input and thus it requires much longer time to process the video and extract features when implemented in real-time.

Figure 18:
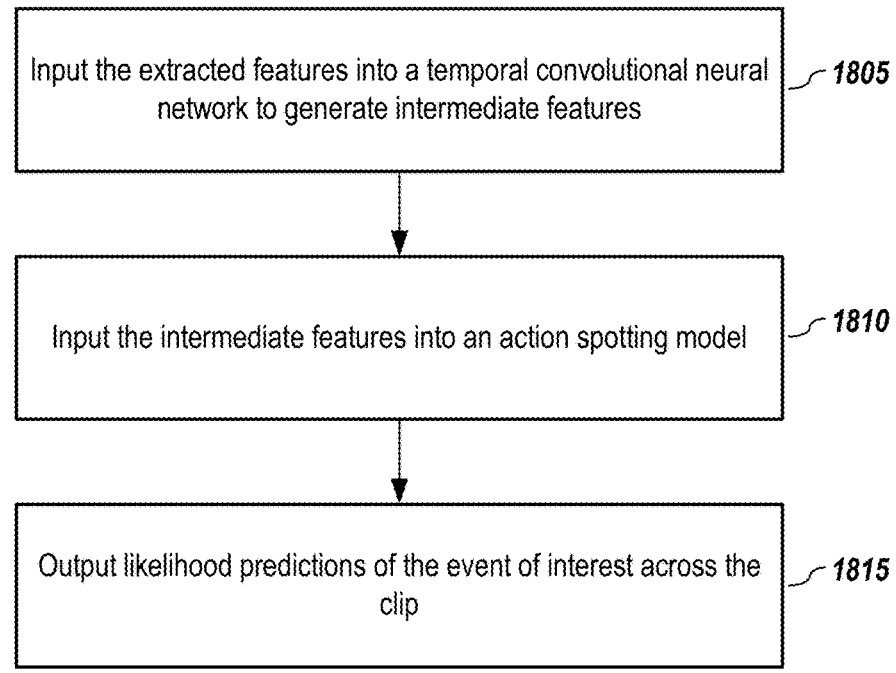
FIG. 18 depicts a method for predicting likelihood of an event of interest in a video clip, according to embodiments of the present disclosure.
Figure 19:
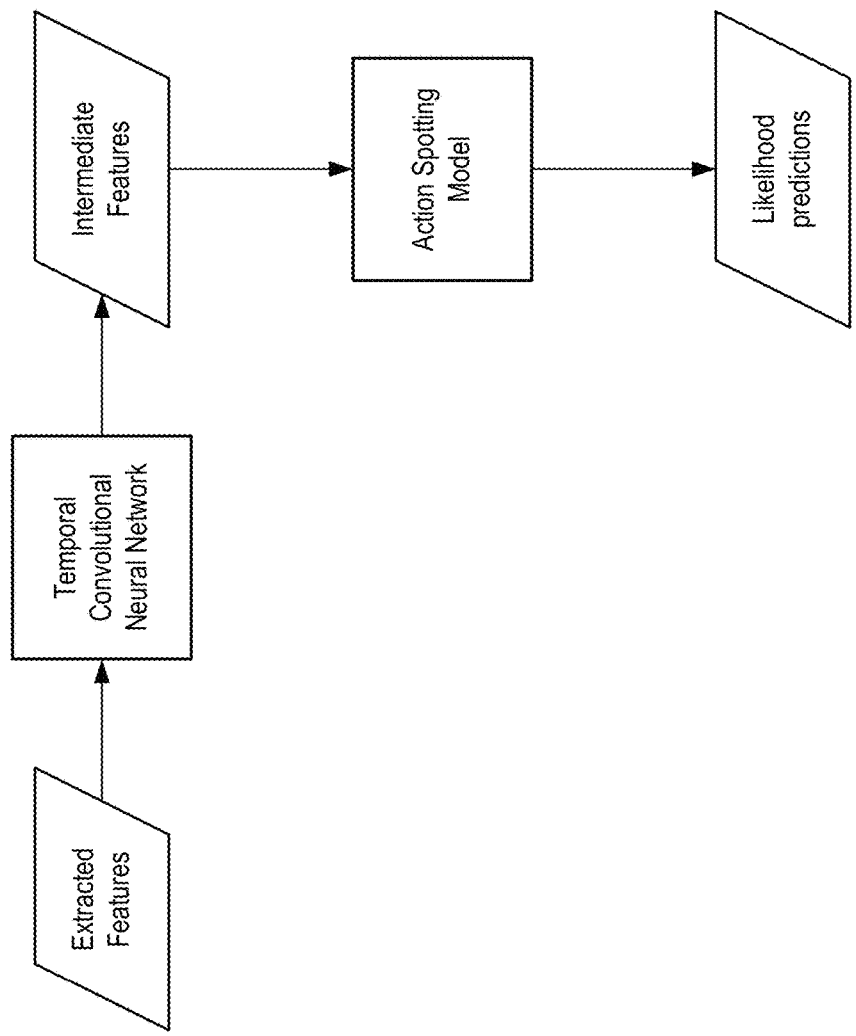
FIG. 19 illustrates a pipeline for action spotting prediction, according to embodiments of the present disclosure.

In one or more embodiments, the extracted features input may be the extracted features from the ResNet model discussed above or the AVSlowFast multi-task model discussed above. Alternatively, for the AVSlowFast multi-task model, the segmentation parts of the action spotting model may be removed. FIG. 18 depicts a method for predicting likelihood of an event of interest in a video clip, according to embodiments of the present disclosure. In one or more embodiments, a temporal convolution neural network receives (1805) as input the extracted features from the AVSlowfast multi-task model. For each frame, it outputs a set of intermediate features, which mixes temporal information across the frames. Then, in one or more embodiments, the intermediate features are input (1810) into an action spotting module, which generates (1815) the spotting predictions (e.g., likelihood predictions across the span of the clip of the event of interest occurring at each time instant), which may be assessed through an action spotting loss function. FIG. 19 illustrates a pipeline for action spotting prediction, according to embodiments of the present disclosure.

5. Ensemble Learning Embodiments

In one or more embodiments, a single predicted time for the event of interest in the clip may be obtained from each of the three models discussed above (e.g., picking a maximum value). One of the predictions may be used or the predictions may be combined (e.g., averaged). Alternatively, an ensemble model may be used to combine information from each of the models in order to obtain a final prediction of the event of interest in the clip.

Figure 20:
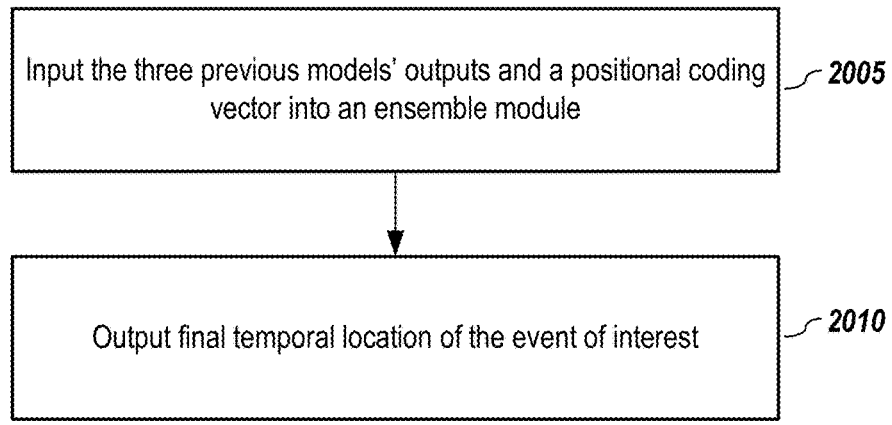
FIG. 20 depicts a method for predicting likelihood of an event of interest in a video clip, according to embodiments of the present disclosure.
Figure 21:
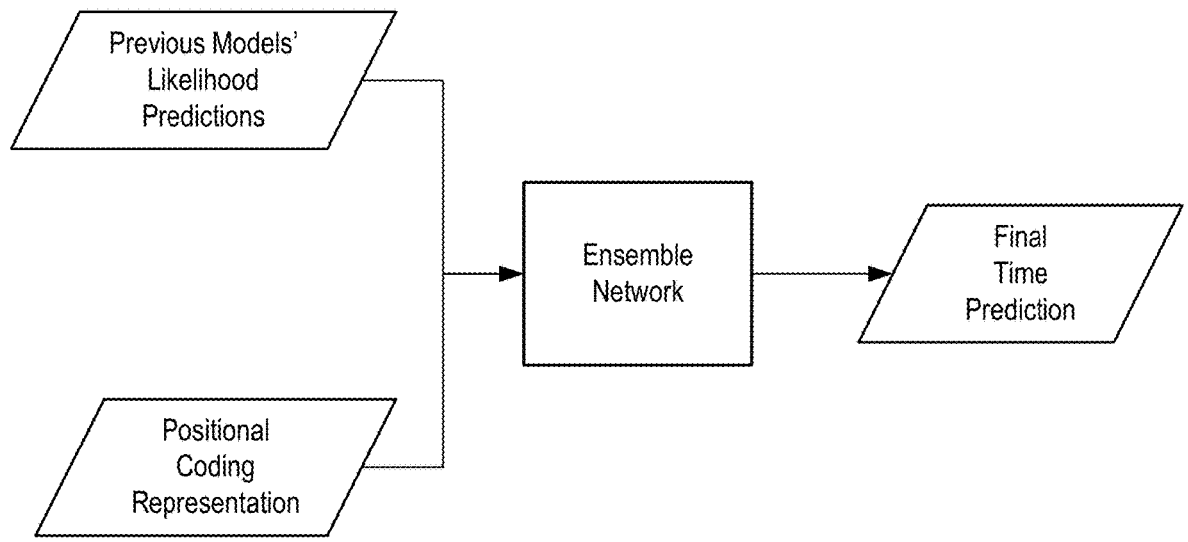
FIG. 21 illustrates a pipeline for final time prediction using an ensemble neural network model, according to embodiments of the present disclosure.

FIG. 20 depicts a method for predicting likelihood of an event of interest in a video clip, according to embodiments of the present disclosure, and FIG. 21 illustrates a pipeline for final time prediction, according to embodiments of the present disclosure. In one or more embodiments, the final accuracy may be enhanced in an ensemble fashion, aggregating the output of the three models/features described in the above subsections. In one or more embodiments, all three previous models' outputs, together with a positional coding vector, may be combined as the input (2005) of the ensemble module. The combining may be done using concatenation, e.g., 4 d-dimension vectors become a 4×d matrix. For the ResNet and the AVSlowfast multi-task models, the input may be their likelihood prediction outputs from their action spotting models of Section 5, above. And, for the audio, the input may be the mean-absolute audio feature of the clip (e.g., FIG. 15B). In one or more embodiments, the positional coding vector is a 1-D vector representing the time length of the clip (i.e., an index).

In one or more embodiments, a core of the ensemble module is an 18-layer 1-D ResNet with a regression head. Essentially, the ensemble module learns a mapping from multidimensional input features comprising multiple modalities to the final temporal location of the event of interest in the clip. In one or more embodiments, the final time value prediction from the ensemble model is output (2010) and may be compared with the ground truth time to compute a loss. The losses of the various clips may be used to update the parameters of the ensemble model.

6. Inference Embodiments

Once trained, the overall highlight generating system, such as depicted in FIG. 1, may be deployed. In one or more embodiments, the system may additionally include an input that allows a user to select one or more parameters for the generated clips. For example, the user may select a specific player, a span of games, one or more events of interest (e.g., goals and penalties), and the number of clips that make the highlight video (or a length of time for each clip and/or the overall highlight compilation video). The highlight generating system may then access videos and metadata and generate the highlight compilation video by concatenating the clips. For example, the user may want 10 seconds per event of interest clip. Thus, in one or more embodiments, the customized highlight video generation module may take the final predicted times for clips and select 8 seconds before the event of interest and 2 seconds after. Alternatively, as illustrated in FIG. 1, key events of a player's career may be the events of interest and they may be automatically identified and compiled into a "story" of the player's career. Audio and other multimedia features may be added to the video by the customized highlight video generation module, in which audio and features may be selected by the user. One skilled in the art shall recognize other applications of the highlight generation system.

D. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Goal Spotting

For fair comparison with the existing works, the tested model embodiments were trained with candidate clips containing goals extracted from games in the train set of a dataset and validated/tested with candidate clips containing goals extracted from games in the valid/test set of the dataset.

Figure 22:
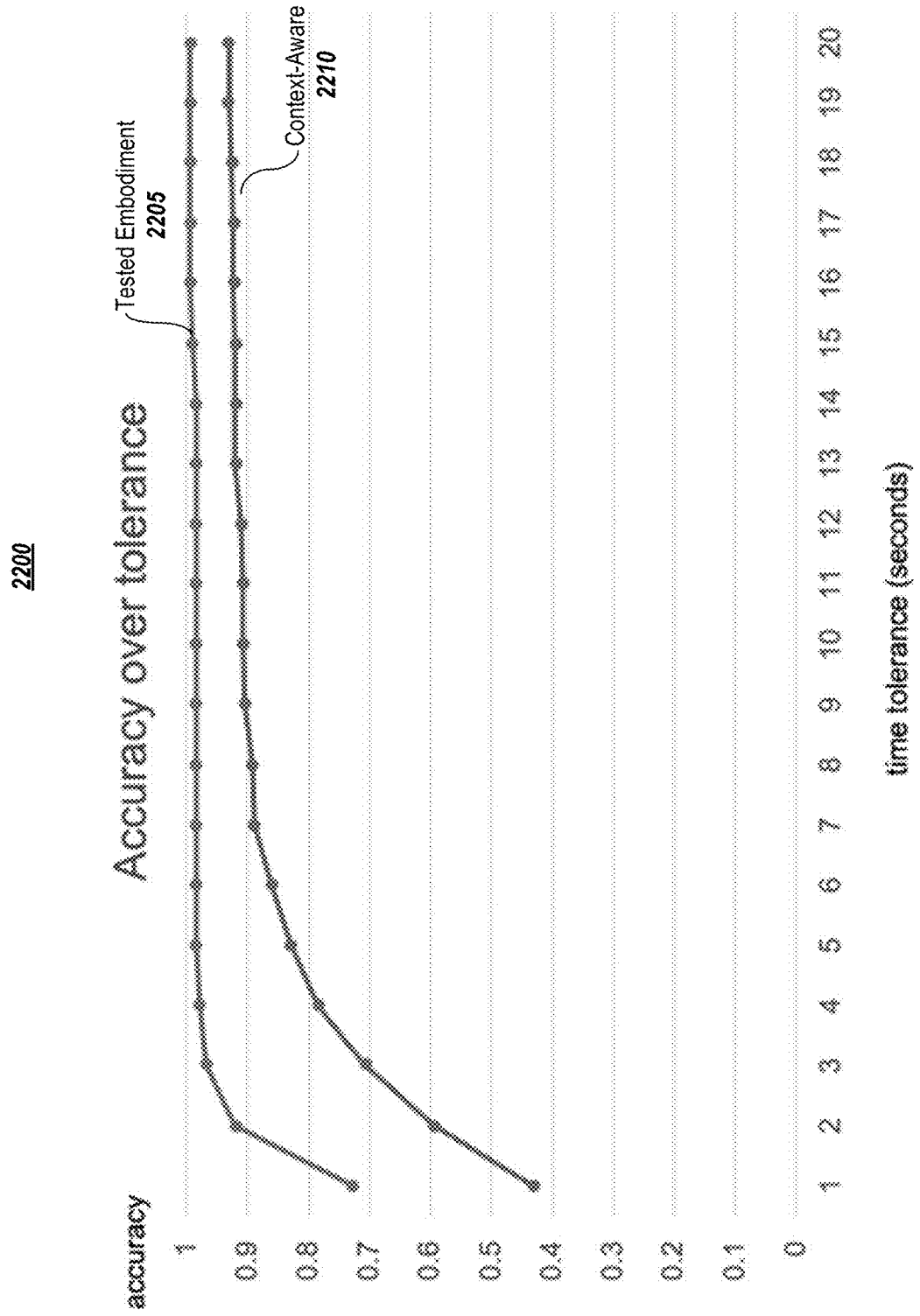
FIG. 22 depicts goal spotting results compared to another method, according to embodiments of the present disclosure.

FIG. 22 shows a main result: to spot the goals in 70-second clips, the tested embodiment 2205 significantly outperforms the current state-of-the-art method 2210 referred to as the Context-Aware approach in spotting goals in soccer.

Figure 23:
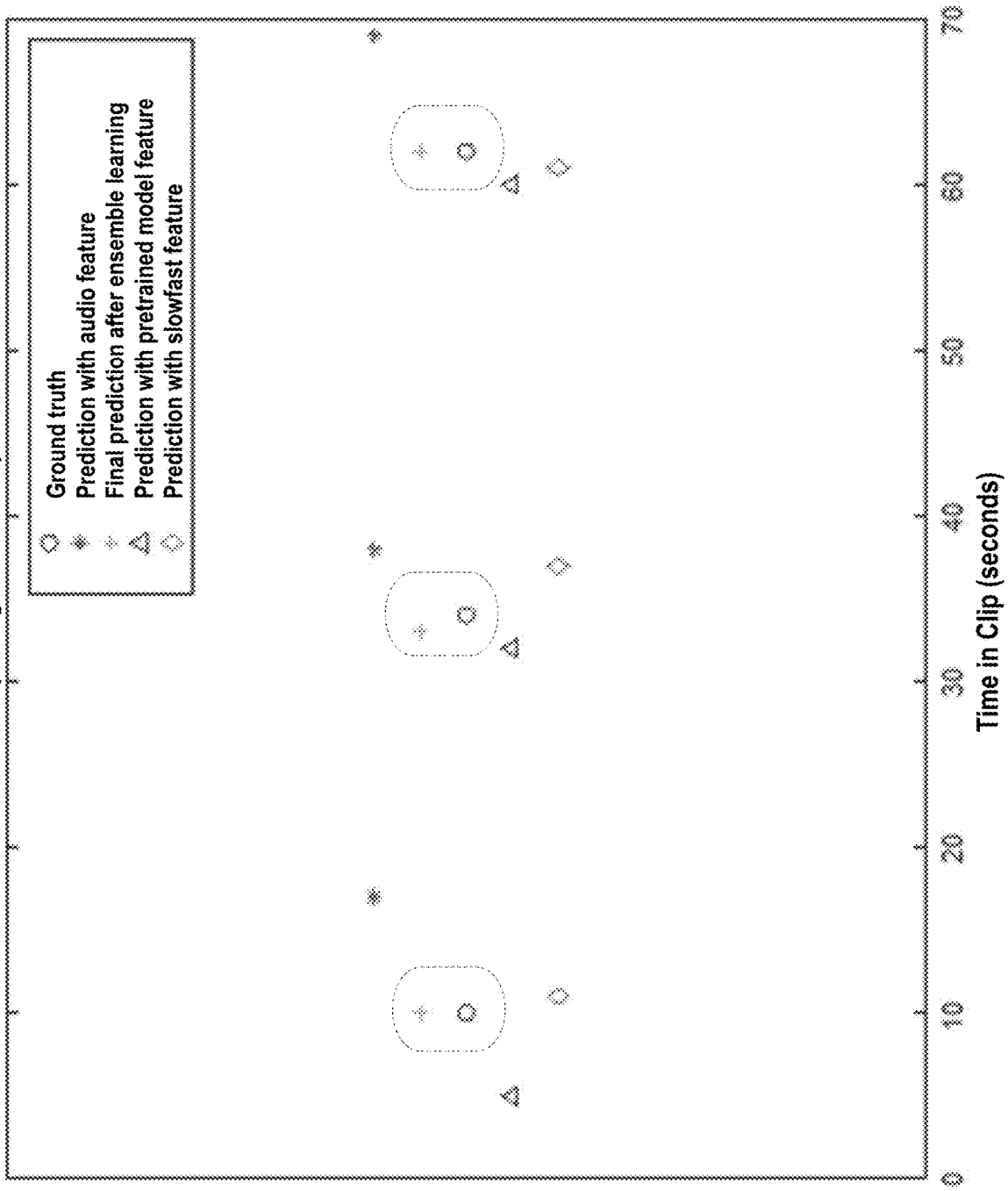
FIG. 23 shows goal spotting results for three (3) clips, according to embodiments of the present disclosure. Ensemble learning achieves the best results.

The intermediate prediction results are also shown, which were obtained by using three different features described in Section C.3 or C.4 and the final results predicted by the ensemble learning module described in Section C.5. The goal spotting results for 3 clips were stacked in the FIG. 23. As shown in FIG. 23, the final prediction outputs by the ensemble learning module embodiment are the best in terms of their closeness to the ground truth labels (illustrated with the dashed line ovals).

2. Some Discussion Notes

As shown in FIG. 22, embodiments can achieve close to 1 accuracy (0.984) with a tolerance of 5 seconds. This result is phenomenal since it can be used to correct mislabeling from text and sync with customized audio commentaries. It also helps to generate highlights precisely, and thus gives users/editors options to customize their videos around the exact goal moment. The pipeline embodiments may be naturally extended to catch the moment of other events such as corners, free kicks, and penalties.

It is again reiterated that the use of a soccer game as the overall content and the goal as the event within that content is by way of illustration only, and one skilled in the art shall recognize that aspects herein may be applied to other content domains, including outside of the gaming domain, and to other events.

E. Alternative Embodiments

1. Introduction

As noted previously, creating sports highlight videos often involves human efforts to manually edit the original untrimmed videos. The most popular sports videos often comprise short clips of a few seconds, while for machines to understand the video and spot key events precisely is very challenging. Embodiments herein present a two-stage paradigm to solve at least two problems in understanding videos and detecting target events (which may also be referred to as events of interest or actions). These two problems are action spotting and replay grounding. Examples of these two problems have been defined in SoccerNet-v2 challenge (Adrien Deliege, Anthony Cioppa, Silvio Giancola, Meisam J. Seikavandi, Jacob V. Dueholm, Kamal Nasrollahi, Bernard Ghanem, Thomas B. Moeslund, and Marc Van Droogenbroeck, "Soccernet-v2: A dataset and benchmarks for holistic understanding of broadcast soccer videos," in *Proceedings of the IEEE/CVF Conference on Computer Vision and Pattern Recognition (CVPR) Workshops*, June 2021, pp. 4508-4519, which is incorporated by reference herein in its entirety).

The action spotting task aims at spotting actions such as goal, shots-on target, shots-off target, yellow card, red card, etc., in a complete video of a soccer game. The replay grounding task is to ground the timestamps of the actions represented in a specific replay. In one or more embodiments, the same first stage is shared in both two tasks, which uses finetuned action recognition models to extract semantic features, and the second stage comprises a temporal detection module tailored for each task.

In sports analytics, many computer vision and signal processing technologies are developed to understand sports broadcasts. Specifically, in soccer, some researchers proposed algorithms to parse the structure of soccer videos and analyze the games with hidden Markov models, investigate scene transition structure to detect replays, propose a framework to incorporate both audio and video streams to detect events, develop algorithms to recognize group activities on the field using broadcast stream and trajectory data, and leverage the temporal context information around the actions to handle the intrinsic temporal patterns representing these actions.

While previous works mostly focus on developing a single model for a specific task in soccer video analysis, embodiments presented below provide a generic and flexible two-stage paradigm, leverage multiple action recognition models to extract diverse semantic features, and design a novel transformer-based detection module to aggregates non-local cues through a weighted sum of semantic features at attended temporal locations in soccer videos.

Some of the main contributions provided by these embodiments may be summarized as the following:

Taking advantage of multiple recent action recognition models pretrained on large-scale video datasets, embodiments extract semantic features of soccer videos by fine-tuning each model as the feature extractor, on an auxiliary snippet dataset. In one or more embodiments, the features obtained from each model are concatenated and normalized to generate strong semantic feature embeddings. Embodiments of the feature combination significantly improve both action spotting and replay grounding performance.

Embodiments of a novel transformer-based temporal detection module to spot actions and ground replays in soccer videos. Self-attention mechanism is employed to capture long-range context information and dynamically adjust weights according to the input, i.e., the combined semantic features. Extensive experiments show our approach is superior to all other methods and achieves state-of-the-art performance in both the action spotting task and the replay grounding task in the SoccerNet-v2 Challenge.

Figure 24:
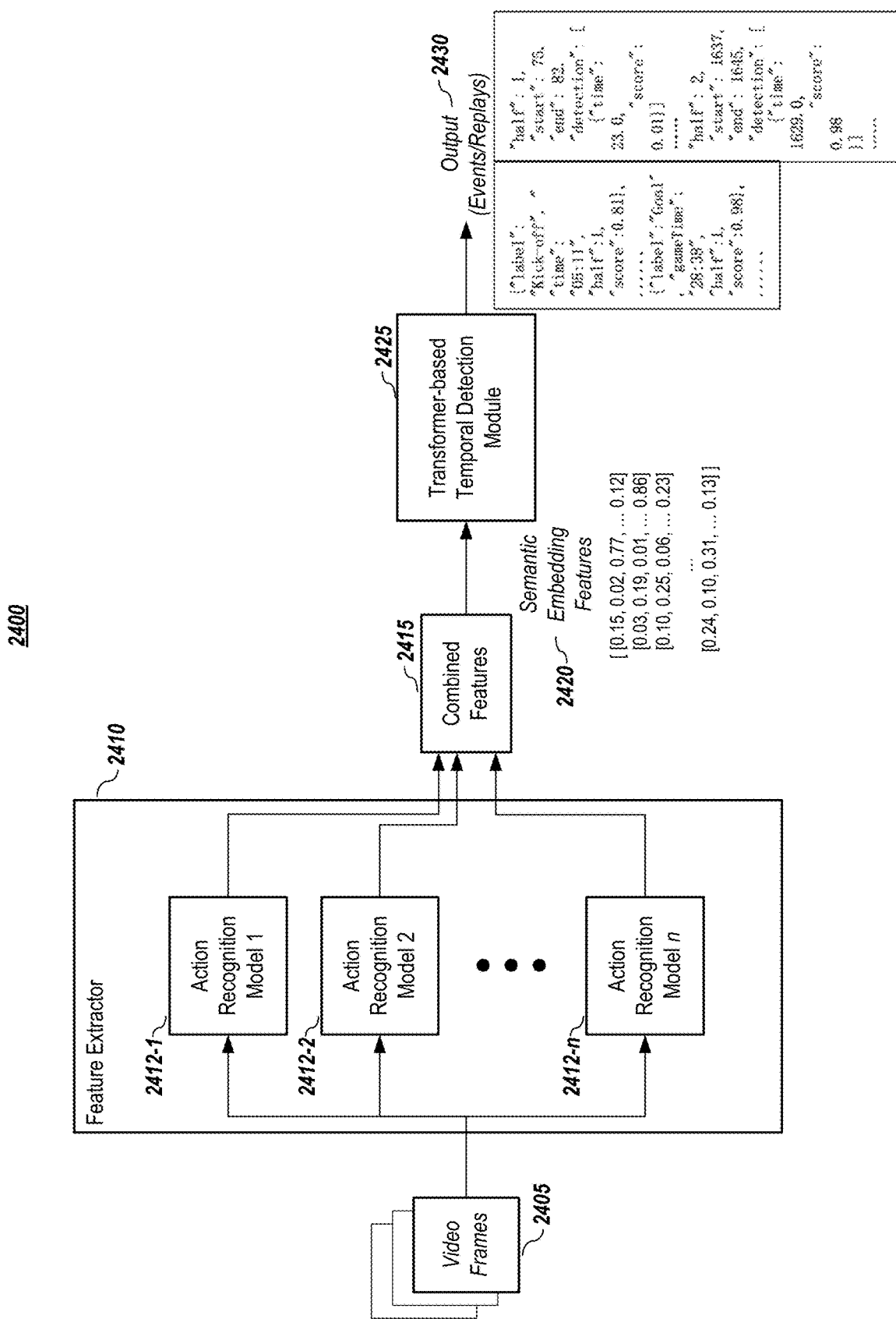
FIG. 24 depicts a two-stage system for action spotting and/or replay grounding, according to embodiments of the present disclosure.

FIG. 24 depicts a two-stage system for action spotting and/or replay grounding, according to embodiments of the present disclosure. As illustrated, video frames 2405 are input into a feature extractor module 2410. In one or more embodiments, the feature extractor module 2410 comprises a plurality of pretrained action recognition models 2412-1-2412-n, in which each pretrained action recognition model 2412-x receives the input video 2405 as input and extracts features. As explained in more detail below, the extracted features of the pretrained action recognition model 2412-x are combined into a combined set of features 2415. These combined features 2415 are input into the second stage of the system 2400, which may be a transformer-based temporal detection module 2425 for action spotting or replay grounding. In one or more embodiments, the output 2430 is a label (e.g., "goal"), a video time (e.g., "28:38") of the event, a score of the probability for output (e.g., "0.98"), and may include additional information, such as the half in which the event occurred.

More details about the various modules and embodiments are provided below.

2. Feature Extraction Embodiments

Both the previous competitive method NetVLAD++ (Silvio Giancola and Bernard Ghanem, "Temporally-aware feature pooling for action spotting in video broadcasts," in *The IEEE Conference on Computer Vision and Pattern Recognition (CVPR) Workshops*, June 2021, which is incorporated by reference herein in its entirety) for action spotting and the baseline method CALF_more_negative (Cmn) (Deliege et al., cited above) for replay grounding use per-frame features extracted by ResNet pretrained on ImageNet. However, it is believed that features that are tailored for the soccer broadcast videos can improve the performance of the spotting module. In one or more embodiments, multiple action recognition models were finetuned on snippets of soccer videos; and in the test stage, features were extracted from videos (clips of frames), rather than on a per-frame basis.

In one or more embodiments, multiple action recognition models were finetuned on the task of action classification. For tests herein, the models used included:

TPN (Ceyuan Yang, Yinghao Xu, Jianping Shi, Bo Dai, and B. Zhou, "Temporal Pyramid Network For Action Recognition," 2020 IEEE/CVF Conference on Computer Vision and Pattern Recognition (CVPR), pp. 588-597, 2020, which is incorporated by reference herein in its entirety);

GTA (Bo He, Xitong Yang, Zuxuan Wu, Hao Chen, Ser-Nam Lim, and Abhinav Shrivastava, "GTA: Global Temporal Attention For Video Action Understanding," arXiv preprint arXiv:2012.08510, 2020, which is incorporated by reference herein in its entirety);

VTN (Daniel Neimark, Omri Bar, Maya Zohar, and Dotan Asselmann, "Video Transformer Network," arXiv preprint arXiv: 2102.00719, 2021.

irCSN (Du Tran, Heng Wang, Matt Feiszli, and Lorenzo Torresani, "Video Classification With Channel-Separated Convolutional Networks," in 2019 *IEEE/CVF International Conference on Computer Vision (ICCV)*, 2019, pp. 5551-5560, which is incorporated by reference herein in its entirety); and I3D-Slow (Christoph Feichtenhofer, Haoqi Fan, Jitendra Malik, and Kaiming He, "Slowfast Networks For Video Recognition," 2019 *IEEE/CVF International Conference on Computer Vision (ICCV)*, pp. 6201-6210, 2019.

It should be noted that other and different action recognition models may be used.

Figure 25:
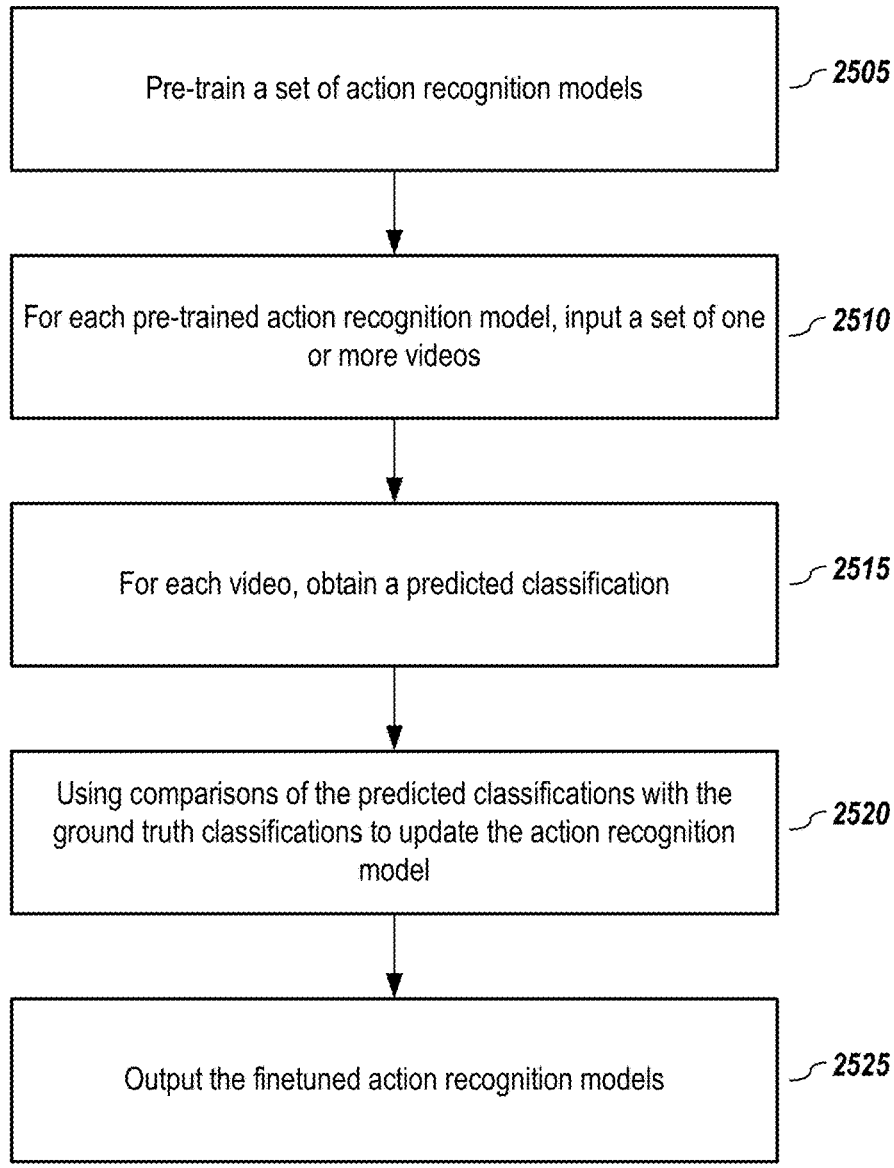
FIG. 25 depicts a method for finetuning the action recognition models, according to embodiments of the present disclosure.

FIG. 25 depicts a method for finetuning the action recognition models, according to embodiments of the present disclosure. As a preliminary matter, each of the action models is pretrained (2505) using training data. In one or more embodiments, to perform finetuning, an 18-class snippet dataset was created by extracting snippets, each being 5 seconds long, from all the videos. Each snippet centers at one of the 17 classes of events or randomly samples from background (non-event); thus, for each snippet, the class label is known. For each pre-trained action model, a set of one or more videos is input (2510) into the pre-trained model. For each video, a predicted classification is obtained (2515), and comparisons of the predicted classifications with the ground truth classifications are used (2520) to update the action recognition model. Once finetuning training has reached a stop condition, the finetuned action recognition models are output for use as the feature extractor (e.g., feature extractor 2410 in FIG. 1).

In one or more embodiments, each finetuned action recognition model (e.g., action recognition models 2412-$x$) is applied on temporal sliding windows of videos, and output features are concatenated along the feature dimension.

In one or more embodiments, mathematically, for a given video with a duration of S seconds, if the semantic feature is extracted at an equivalent sampling rate of r frames per second, then the dimension of the output feature will be $rS \times D_i$, where $D_i$ is the length of the feature extracted using the ith finetuned model. Let $\mathcal{F}_i \in \mathbb{R}^{rS \times D_i}$ denote the semantic feature extracted using ith model, for i=1, 2, . . . n, the combined feature may be obtained:

$$\mathcal{F}_{combined} \in \text{Concat}(\alpha_1 \mathcal{F}_1, \alpha_2 \mathcal{F}_2, \ldots, \alpha_n \mathcal{F}_n) \quad (1)$$

where $\mathcal{F}_{combined} \in \mathbb{R}^{rS \times \Sigma_{i=1}^n (D_i)}$, "Concat(•)" is a concatenation operator, and $\alpha_i$ denotes the coefficient for each semantic feature $\mathcal{F}_i$. It shall be noted that the combination of features is unlike an ensemble of models. For example, the final output classification of these models is not be used; rather, an intermediate value—the extracted features—is what is being used from each model.

Presented next is a brief introduction to the five pretrained action recognition models that were used in embodiments to finetune. It shall be noted that fewer or more networks may be used, and different networks may be used. The temporal pyramid network (TPN) efficiently incorporates visual information of different speeds at the feature level and can be integrated into 2D or 3D backbone networks. The global temporal attention (GTA) mechanism for video action classification models global spatial and temporal interactions in a decoupled manner. It captures temporal relationships on both pixels and semantically similar regions. The video transformer network (VTN) adopts a transformer-based network structure for video classification, and it tends to train faster than 3D CNN networks. The interaction-reduced channel-separated convolutional networks (irCSN) factorizes 3D convolutions by separating channel interactions and spatio-temporal interactions. In this way, a regularization effect is observed when training the network. The authors of this network have pretrained it on a largescale dataset (e.g., IG-65M). The I3D-Slow network preserves the slow pathway, which operates at a low frame rate and captures spatial semantics in the SlowFast framework. The authors of this network have pretrained it with OmniSource data.

3. Temporal Detection Embodiments

In this section, embodiments of transformer-based temporal detection modules are presented along with information related to training for action spotting and replay grounding in soccer videos. As noted previously, while the events and subject matter of the videos are related to soccer, aspects of the present disclosure may be adapted for use for other subject matters and other events of interest.

a) Action Spotting Embodiments

Figure 26:
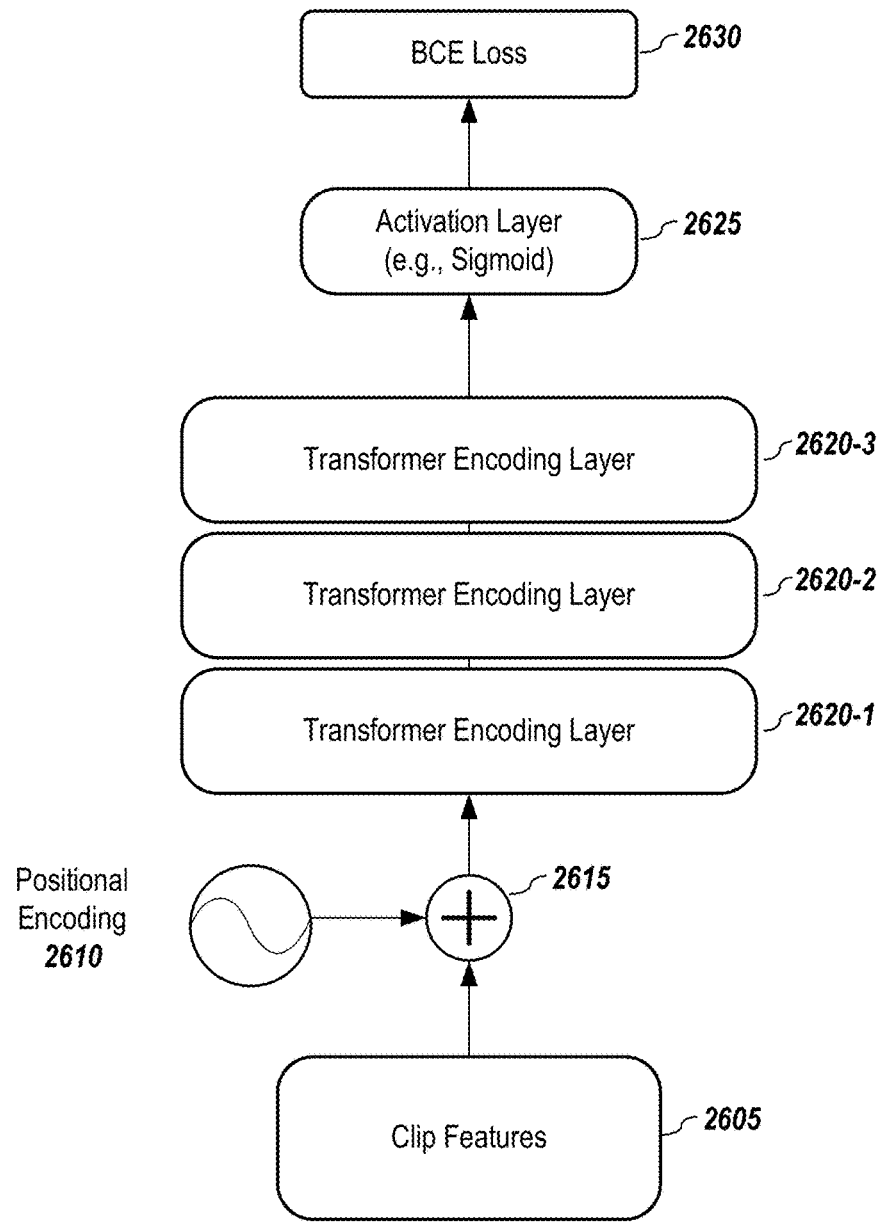
FIG. 26 depicts a transformer-based model for action spotting, according to embodiments of the present disclosure.

For the action spotting task, embodiments of a transformer model were designed, where the input is the combined features (e.g., the combined feature from Eq. (1), above). FIG. 26 depicts a transformer model for action spotting, according to embodiments of the present disclosure. In one or more embodiments, sine and cosine positional encoding 2610 are applied to inject information about the relative or absolute position of the input tokens in the clip features (e.g., each input token is features of a frame). As illustrated, a summation module 2615 receives the combined semantic features 2605 from the feature extractor and the corresponding positional encodings as inputs and combines them to form an input for a first transformer encoding layer of a plurality of transformer encoding layers. In one or more embodiments, a transformer encoder 2700 is used to obtain an output of dimension C to represent the C-class probabilities (in embodiments C=18). As shown in the embodiment depicted in FIG. 26, there are three transformer encoding layers 2620 that after the positional encoding 2610. Also depicted is an activation layer 2625 (which may be a sigmoid function) that receives the input from the final transformer encoding layers 2620-3 and output the C-class probabilities.

Figure 27:
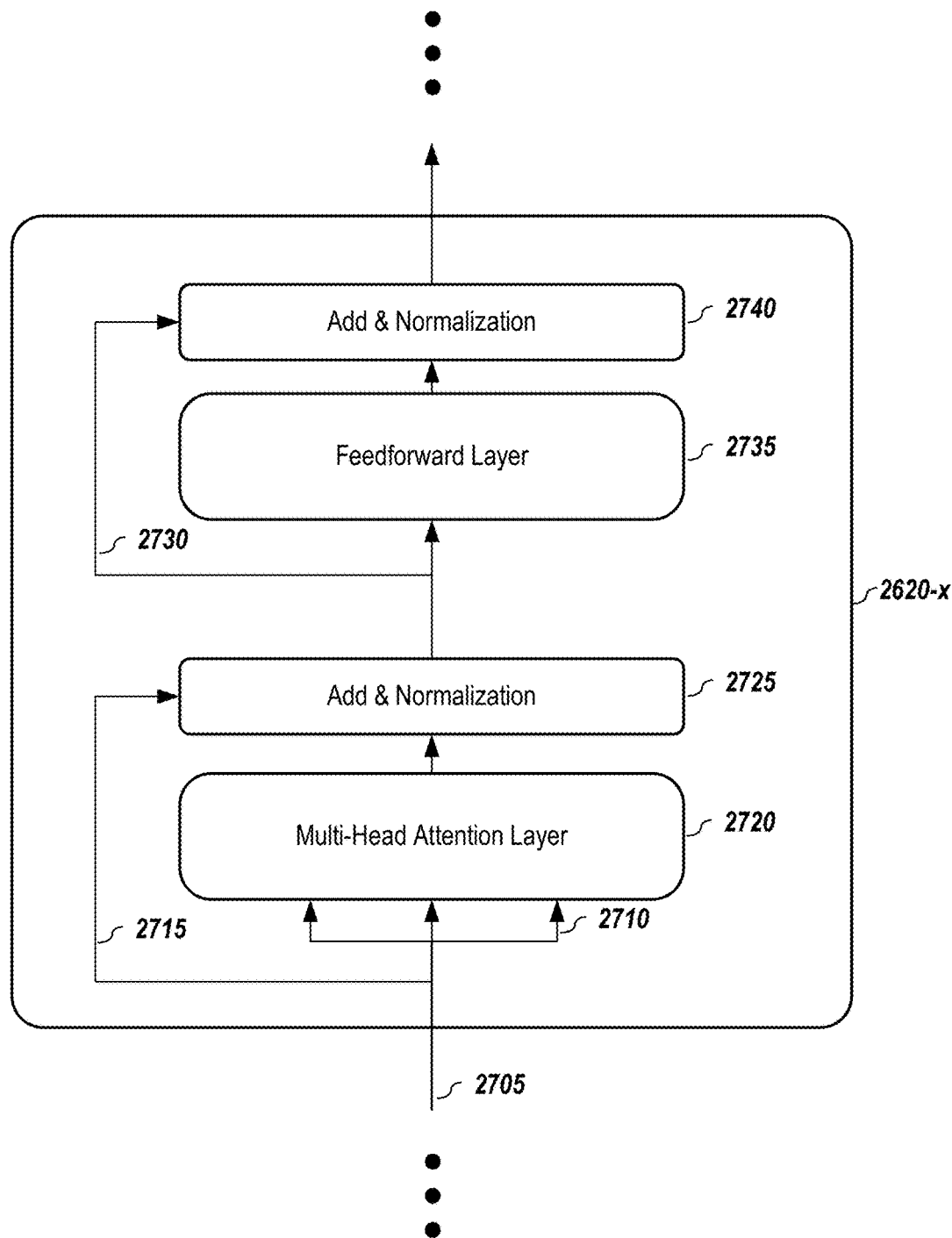
FIG. 27 depicts a transformer layer with multi-head self-attention, according to embodiments of the present disclosure.

In one or more embodiments, a multi-head self-attention mechanism may be employed for one or more of the transformer encoding layers. FIG. 27 depicts a transformer layer 2620 with multi-head self-attention, according to embodiments of the present disclosure. The attention mechanism essentially maps a query and a set of key-value pairs to an output. As illustrated in FIG. 27, the query, keys, and values 2710 are from the input 2705 (which can be from the summation module or from a prior transformer encoding layers) into a multi-head attention layer 2720. In one or more embodiments, the number of heads is 4 and a hidden dimension size of 64 is used for the encoding layers. Also depicted in FIG. 27 are a skip connection 2715 that connects to an add and normalization layer 2725 that also receives input from the multi-head attention layer 2720. The output from the add and normalization layer 2725 is supplied to a feedforward layer 2735 and to another add and normalization layer 2740. The output may be computed as a weighted sum of the values, where the weight assigned to each value is computed by a compatibility function of the query with the corresponding key.

Figure 28:
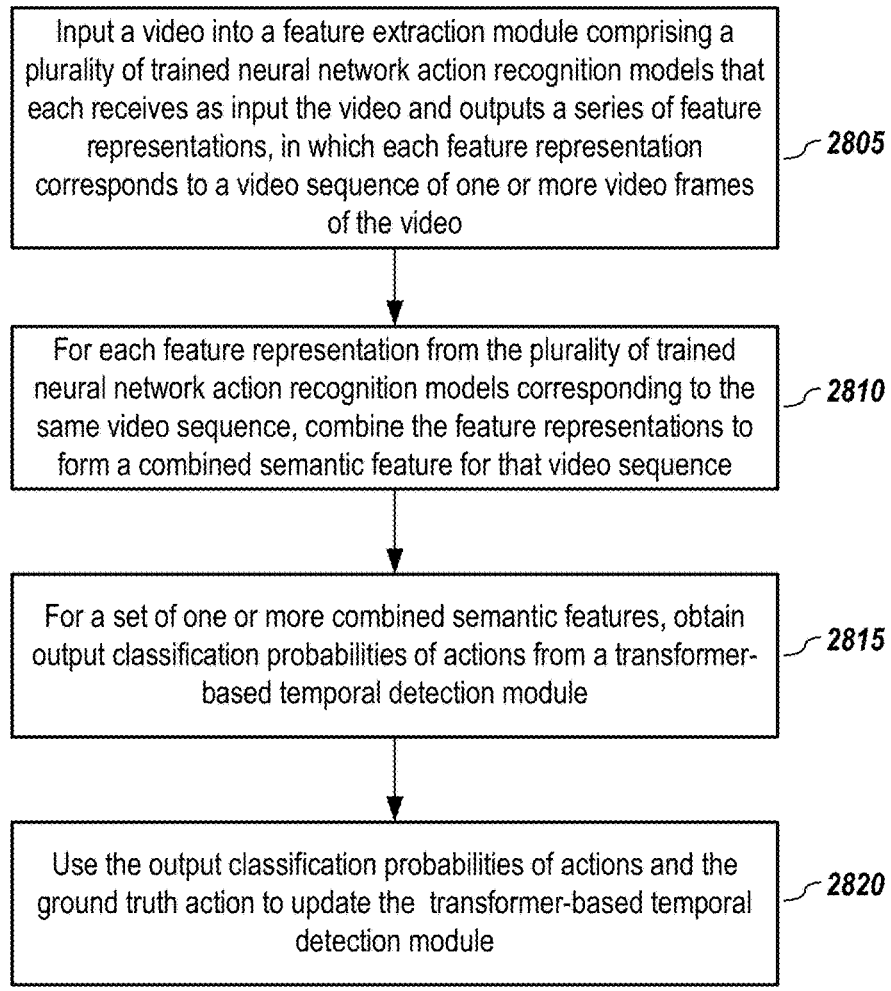
FIG. 28 depicts a methodology of using a transformer-based temporal detection module, according to embodiments of the present disclosure.

FIG. 28 depicts a methodology of using a transformer-based temporal detection module, according to embodiments of the present disclosure. In one or more embodiments, a video is input (2805) into a feature extraction module comprising a plurality of trained neural network action recognition models that each receives as input the video and outputs a series of feature representations, in which each feature representation corresponds to a video sequence of one or more video frames of the video. It should be noted that a video sequence may be formed from a sliding window which may comprise overlapping frames, non-overlapping frames, or may skip some frames. For each feature representation from the plurality of trained neural network action recognition models corresponding to the same video sequence, the feature representations are combined to form a combined semantic feature for that video sequence. For example, in one or more embodiments, the features may be combined according to Eq. (1).

For a set of one or more combined semantic features, an output classification probabilities of classes (e.g., actions) is obtained (2815) from a transformer-based temporal detection module.

During training of the transformer-based temporal detection module, comparison of the output classification probabilities of classes with the ground truth class may be used to determine a loss for use in updating the transformer-based temporal detection module. In one or more embodiments, a binary cross-entropy loss function may be used in training, which is defined below:

$$Loss_{BCE} = -\frac{1}{N}\sum_{i=1}^{N}[y_i \log(p(y_i) + \epsilon) \\ + (1-y_i)\log(1-p(y_i)+\epsilon)] \quad (2)$$

where $y_i$ is the ground-truth label for example i and $p(y_i)$ is the probability of the prediction being correct, $\epsilon$ is a small positive constant to prevent the loss value become not a number (NaN) during training, and N is the total number of examples.

In training, in one or more embodiments, a mix-up augmentation may be employed to reduce overfitting. A mix-up augmentation comprises adding to inputs according to some weighted blend (e.g., two inputs blended 60% and 40%), in which the model should output the same (or a close approximation) of that weighted blend in its probability.

For using a trained transformer-based temporal detection module, the output may be used to assign a class label to an input video. For example, in one or more embodiments, for the set of one or more combined semantic features, an action label may be assigned to the action label from a set of action labels that has the highest classification probability. In one or more embodiments, a threshold value may be used (i.e., the highest classification probability must be above a threshold value, otherwise no action label is assigned). In one or more embodiments, no threshold value may be used (i.e., the threshold is zero). Additionally, in one or more embodiments, a video time of the action may also be output, in which the video time is identified using a time value or time values correlated to the video sequences that correspond to the set of one or more combined sematic features that had the assigned action label.

In one or more embodiments, responsive to two more or sequential sets of one or more combined semantic features having been assigned the same action label, the system may deem the action to span both sets. Thus, in one or more embodiments, a start time of the first video sequence of the first set of one or more combined semantic features and an end time of the last video sequence of the last set of one or more combined sematic features may be identified, and given the start time and the end time, a video time of the action is output. The video time may be a single time value or may be a time interval. In one or more embodiments, a single time value may be obtained by identifying a middle combined sematic feature of the set of one or more combined sematic features and identifying the time value as the video time corresponding to a middle video frame of the middle combined sematic feature (e.g., selecting the middle time of the video sequence).

b) Replay Grounding Embodiments
(i) Replay Pattern Analysis Embodiments

Figure 29:
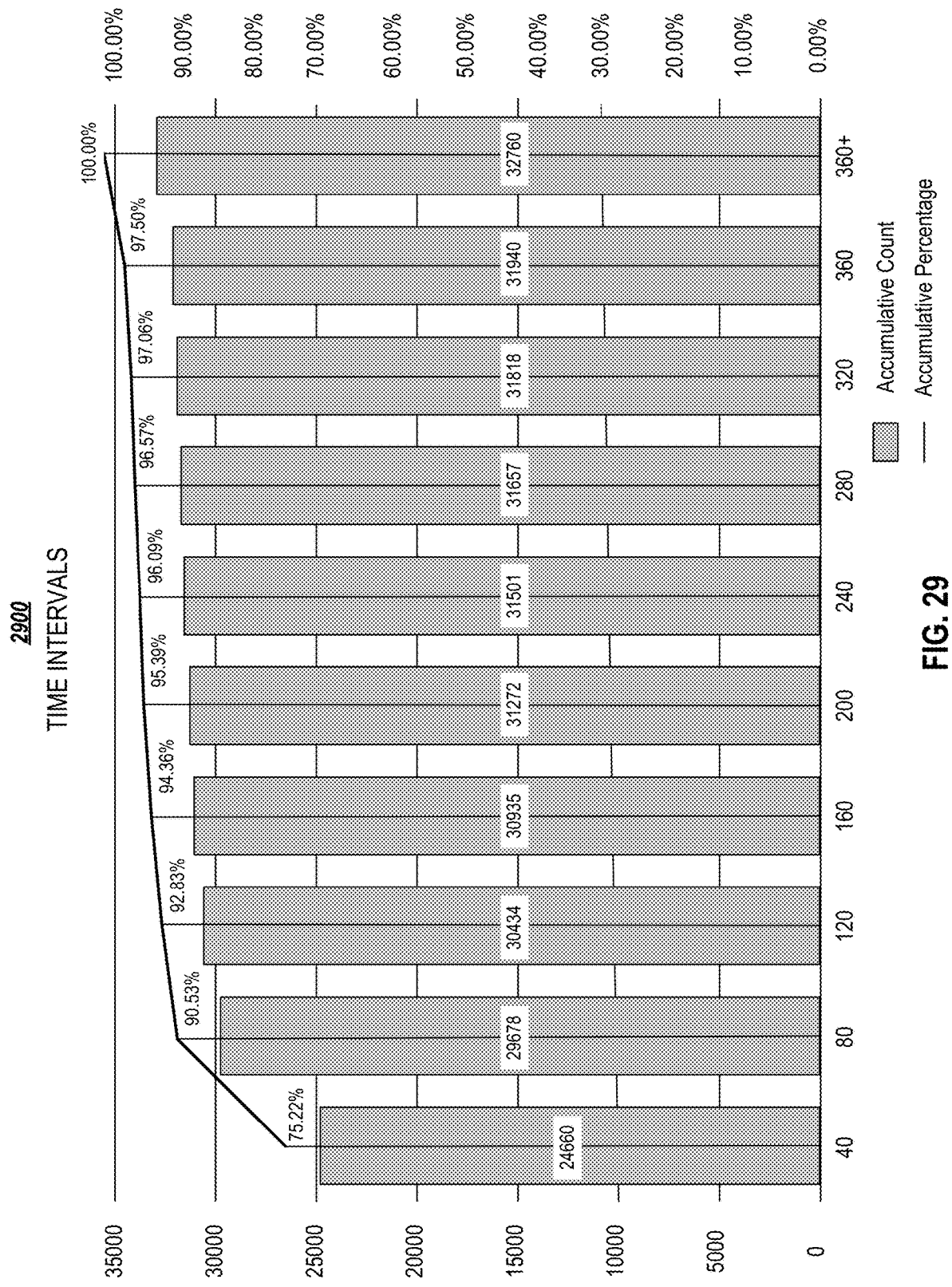
FIG. 29 shows the distributions of time intervals between the end timestamp of a replay and the original event's timestamp.
Figure 30:
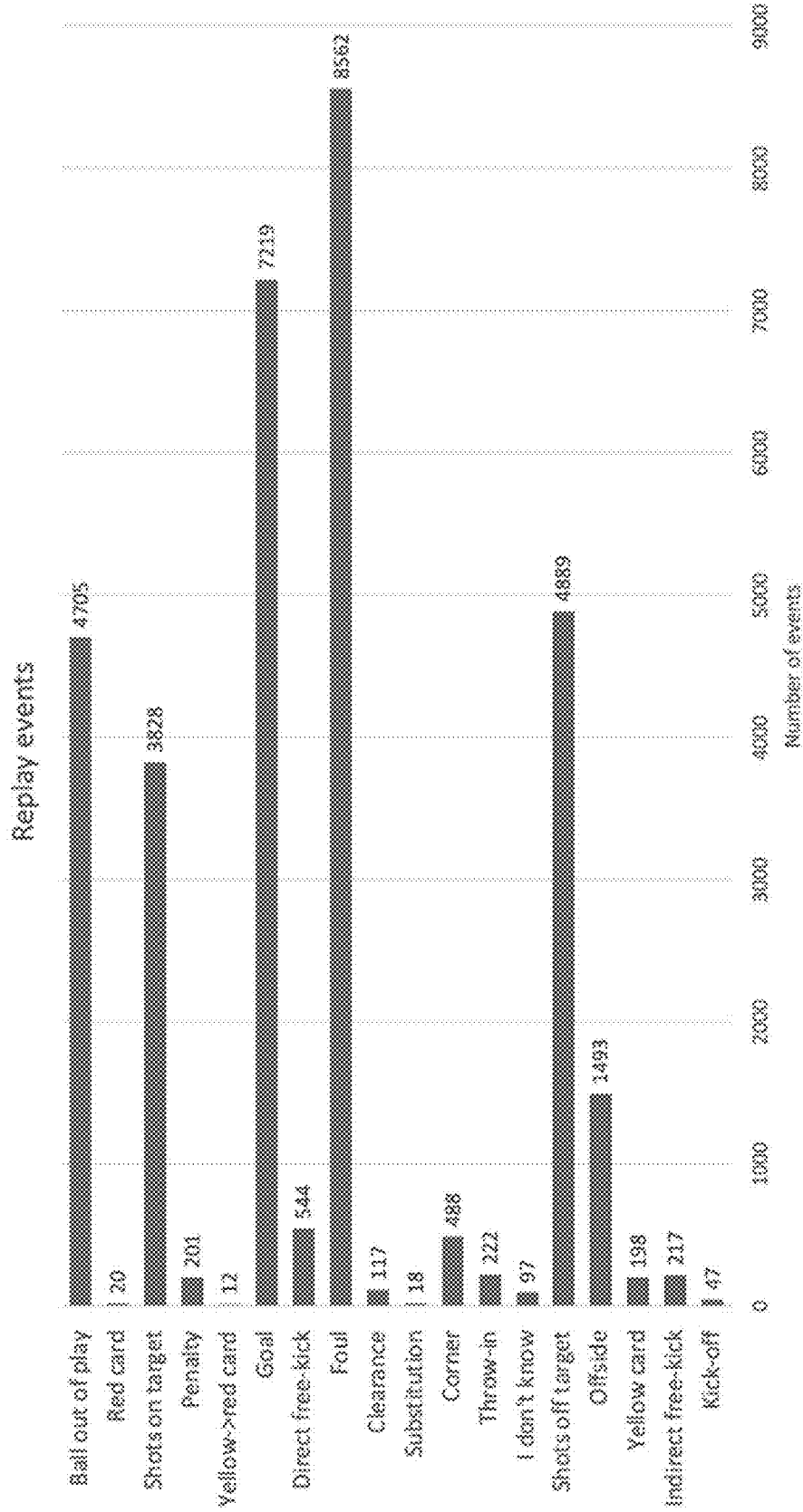
FIG. 30 shows the number of different types of events in ground-truth replay annotations.

To better choose network structure when designing a transformer framework for a replay grounding task, replay annotations in a dataset were examined. FIG. 29 shows the distributions of time intervals between the end timestamp of a replay and the original event's timestamp. It was found that 92.83% of the time intervals fall in the range of 0-120 seconds. Therefore, for efficient training and inference, embodiments of the transformer-based grounding module were designed to focus on this range. Also, the top events were examined. FIG. 30 shows the number of different types of events in ground-truth replay annotations, and the top 3 events in terms of total counts were found to be foul, goal, and shots-off target, respectively. In one or more embodiments, this observation was used to design fusion strategies in post-processing, which is described in the experiments section, below.

(ii) Transformer-Based Grounding Module Embodiments

Figure 31:
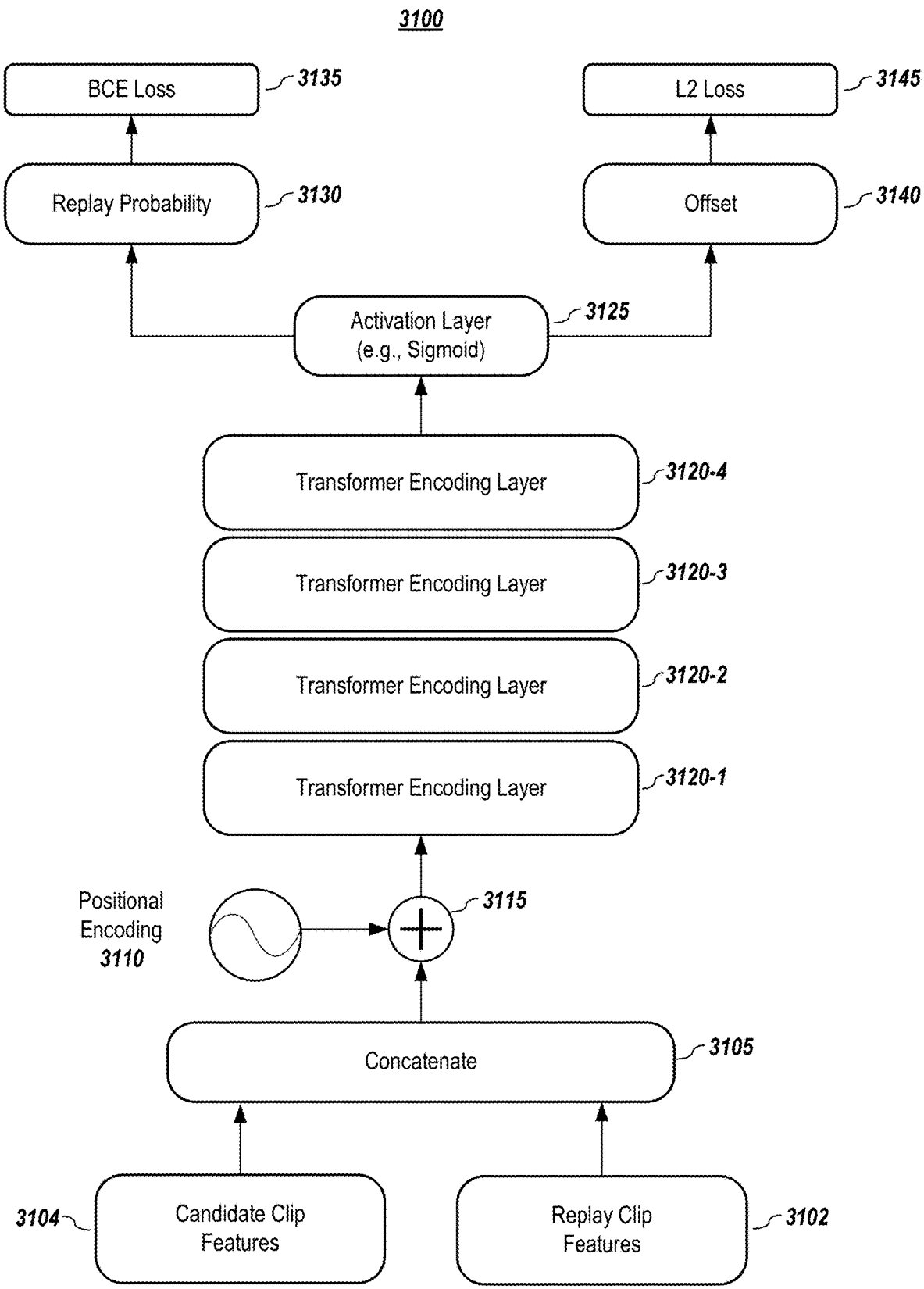
FIG. 31 depicts a transformer model for replay grounding, according to embodiments of the present disclosure.

To capture the relationship between the replay clip and candidate clip, a transformer encoder framework was designed. FIG. 31 depicts a transformer model for replay grounding, according to embodiments of the present disclosure. Note that embodiments of the transformer model for replay grounding share a number of similarities with the transformer model for action spotting. For example, sine and cosine positional encoding 3110 and transformer encoding layers (in which one or more layers may employ multi-head self-attention) may be employed. As shown in FIG. 31, the input comprises semantic features of a replay clip 3102 and a candidate clip 3104. In one or more embodiments, a series of encoding layers 3120-x (e.g., 4 layers) are stacked to obtain an output with 2 dimensions—replay probability 3130 and positional offset 3140 (e.g., offset in [0,1]) in the candidate clip. For example, in one or more embodiments, offset means offset relative to the clip length, so if the clip length is 7 seconds, offset "0" means second 0 of the clip, offset "0.5" means 3.5 seconds into the clip, and offset "1" means 7 seconds. In one or more embodiments, this output serves the purpose of predicting replay action and its temporal location in the candidate clip.

Figure 32:
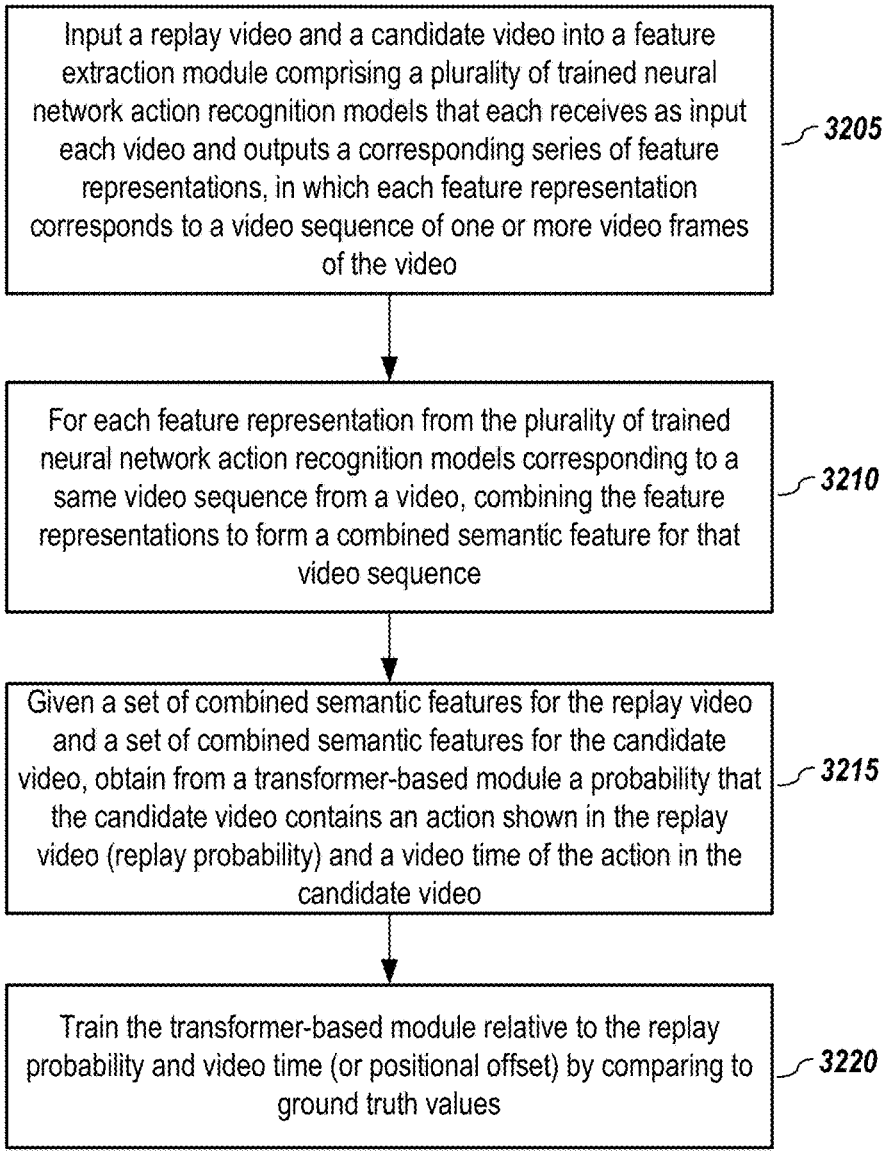
FIG. 32 depicts a methodology of using a transformer-based temporal detection module for replay grounding, according to embodiments of the present disclosure.

FIG. 32 depicts a methodology of using a transformer-based temporal detection module for replay grounding, according to embodiments of the present disclosure. In one or more embodiments, a replay video and a candidate video are input (3205) into a feature extraction module comprising a plurality of trained neural network action recognition models that each receives as input each video and outputs a corresponding series of feature representations, in which each feature representation corresponds to a video sequence of one or more video frames of the video. It should be noted that a video sequence may be formed from a sliding window which may comprise overlapping frames, non-overlapping frames, or may skip some frames. For each feature representation from the plurality of trained neural network action recognition models corresponding to the same video sequence from a video, the feature representations are combined (3210) to form a combined semantic feature for that video sequence. Given a set of combined semantic features for the replay video and a set of combined semantic features for the candidate video, a probability that the candidate video contains an action shown in the replay video (i.e., replay probability) and a video time of the action in the candidate video are obtained (3215) from a transformer-based module.

When training the transformer-based module, the output (i.e., the replay probability and video time (or positional offset)) is compared (3220) relative to ground truth values. In one or more embodiments, the binary cross-entropy loss defined in Eq. 2 may be used to train the replay probability, and L2 loss (defined below) may be used to train the positional offset:

$$Loss_{L2} = \frac{1}{N}\sum_{i=1}^{N}(y_i - \hat{y}_i)^2 \quad (3)$$

where $y_i$ is the ground-truth data point (temporal location), $\hat{y}_i$ is its predicted value, and N is the total number of data points.

In one or more embodiments, for efficient training of the transformer module (e.g., module 3100), the model is fine-tuned on only semantic features of video clips extracted from at most 120 seconds before the start of replays since the feature extractors are already trained on all event snippets from full match videos, and most replays happen within the 120 seconds after the original events according to the replay pattern analysis noted above. In one or more embodiments, in the 120 seconds clip, 4 positive and 4 negative samples may be given to the transformer such that there is sufficient data to better learn the grounding component of the output.

Given a trained transformer module, it uses is the same as or similar to that given in steps 3205, 3210, and 3215, as discussed above. In one or more embodiments, the output comprises an indicator, based upon the class label (e.g., action) probability that the candidate video contains the action shown in the replay video, of whether the candidate video contains the action, and, responsive to the indicator indicating that the candidate video contains the action shown in the replay video, the video time of the action in the candidate video is also output using a time value or time values correlated to video sequences that correspond to one or more combined sematic features for the candidate video.

In like manner as discussed above with respect to the trained model for action spotting, the time value may be a single time or may be a time span or interval and may be determined in like manner by correlating to the video time via the video frames. Similarly, as discussed above, the probability may contain a "no action" class label or, alternatively, may be deemed to not contain an action if no probability exceeds a threshold value.

4. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

a) Dataset and Evaluation

A dataset containing broadcast videos of approximately 600 soccer games was used. The low-quality (LQ) version of these videos at 25 fps (frames per second) with a resolution of 398×224 was used. Presented herein is the performance of embodiments using the Average-mAP metric introduced by SoccerNet-v2.

b) Implementation Details

For the feature extraction stage, Table 2 shows all the action recognition models that were used with their main configurations.

TABLE 2

Video action recognition models for extracting semantic features

| Arch | Backbone | Dimension | Pretrain |
|---|---|---|---|
| TPN | ResNet50/101 | 2048 | K400 |
| GTA | ResNet50 | 2048 | K400 |
| VTN | ViT-Base | 384 | K400 |
| irCSN | ResNet152 | 2048 | IG65M + K400 |
| I3D-Slow | ResNet101 | 2048 | OmniSource |

These models were pretrained from various largescale datasets, including Kinetics-400 (K400), IG65M, and Omnisource. All models were fine-tuned on the same snippet data to reach a reasonable top-1 classification accuracy between 78% and 82% (1-view test) on the test set. At test time, all models slide on the videos and produce features at 1 frame per second (fps).

To boost the performance on the challenge set, the feature extractors (action recognition models) were finetuned on an enlarged snippet dataset, which contains snippets from the train, valid, test videos. The produced features are denoted as mega features if the extractors were finetuned on the enlarged snippet dataset.

In the experiments, the spotting or grounding module embodiments were trained in two modes, regular and ultra. In the regular mode, train, valid, and test sets each served its own purpose. In the ultra mode, the spotting/grounding module embodiments were to learn from as much data as possible, thus all features from train, valid, and test sets were used to train the spotting/grounding module embodiment, for a fixed amount of epochs. For the transformer model embodiment in the action spotting task, a learning rate of $5\times10^{-4}$ was used, and training stopped at 50 epochs. For the replay grounding task, a learning rate of $2\times10^{-4}$ was adopted using a transformer model embodiment, and training was stopped at 40 epochs in ultra mode. The training finishes within 3 hours on a TitanX GPU, which is 10× faster than training the Siamese neural network for replay grounding in a baseline approach (see Deliege et al., cited above).

c) Results and Analysis (i) Action Spotting

Table 3 shows the performance of embodiments of the current patent document with different configurations. When using only one (ordinary) feature from TPN-r50 and performing spotting using NetVLAD++ in the regular mode, as shown in the first row of Table 3, an Average-mAP of 62.96% and 62.35% was achieved on the test and challenge set, respectively, which is about 9%-10% gain over the reference NetVLAD++'s 53.30% and 52.54% on test and challenge sets, respectively. This result shows the superior advantage of using an action recognition model finetuned on the dataset as a feature extractor. When using 4 features or 5 features combined as the input of the spotting module, as shown in row 3 and row 6 in Table 3, about 5%-9% gain was achieved on both the test and the challenge sets over the 1 feature case. Such comparison shows feature combination also significantly improves the performance. Training the spotting module in the ultra mode with 4 mega features results in a challenge Average-mAP of 68.68% (row 5 in Table 3), compared to the regular mode with the ordinary features at 67.51% (row 3 in Table 3) and the regular mode with the mega features at 67.57% (row 4 in Table 3). This comparison implies that the embodiment improves the generalization power if both stages use more data for training. Comparing rows 6 and 8 in Table 3, it can be seen that adjusting chunk size/NMS window size from 15/30 to 7/20 leads to an additional 1.5%-2% gain on the test and challenge sets. The transformer-based spotting module embodiment, trained in the ultra mode with mega features plus adjusted chunk size/NMS window size, achieved the best challenge Average-mAP at 74.84% as shown in row 10 in Table 3. While the NetVLAD++ based module, trained in the same setting, achieves similar performance: 74.63% on the challenge set.

TABLE 3

Experimental results using different features, models, and window sizes. In the features column, each number stands for total types of features used: 1 for TPN-r50 only; 4 for TPN-r50, TPN-r101, GTA, and irCSN; 5 for TPN-r101, VTN, GTA, irCSN, and I3DSlow; 6 for TPN-r50, TPN-r101, VTN, GTA, irCSN, and I3D-Slow.

| Row | Features | Spotting | Chunk/NMS | Test | Challenge |
|---|---|---|---|---|---|
| 1 | ResNet | NV | 15/30 | 53.30 | 52.54 |
| 2 | 1 | NV | 15/30 | 62.96 | 62.35 |
| 3 | 4 | NV | 15/30 | 67.97 | 67.51 |
| 4 | 4 mega | NV | 15/30 | — | 67.57 |
| 5 | 4 mega | NV ultra | 15/30 | — | 68.68 |
| 6 | 5 | NV | 15/30 | 72.64 | 71.08 |
| 7 | 5 | TF | 7/20 | 73.77 | N/A |
| 8 | 5 | NV | 7/20 | 74.05 | 73.19 |
| 9 | 6 mega | NV ultra | 7/20 | — | 74.63 |
| 10 | 6 mega | TF ultra | 7/20 | — | 74.84 |

In the spotting column, NV stands for NetVLAD++, and TF stands for Transformer.
In the test column, "—" means the result was not meaningful, due to the reason that the test set was used in finetuning.
In the Challenge column, "N/A" means it was not evaluated due to limited availability.

(ii) Replay Grounding

Experimental results for replay grounding task experiments are presented in Table 4. As can be seen from the table, taking the finetuned features as input significantly improved the grounding results compared to the baseline average-AP in Row 1. In addition, based on the same grounding module embodiment, combining more features extracted with different action recognition models leads to further improvements. Superior performance was also observed by using a large batch size of 128. To further improve the performance, several post-processing techniques were investigated to refine the grounding module embodiment outputs, based on analysis of the replay pattern:

Filtering: For a Cmn-based grounding module, all spotting results were eliminated 1) after the end timestamp of the replay, or 2) more than 100 seconds (threshold) prior to the end timestamp of the replay. Note the filtering threshold in Row 9 was set to 120 seconds.

Fusion: Taking advantage of the action spotting results, the action classification information was incorporated into the replay grounding task. For each queried replay clip with start time T, the following procedures were adopted. First, spotting predictions with top-3 most frequent labels of replay actions (i.e., Foul, Goal, and Shots-off target) and with the predicted scores higher than S were filtered. Second, the first and second nearest spotting predictions to the replay clip start time T were selected, and that satisfied the constraint that each prediction fell into the temporal window range [T−W, T] because the actual action should happen before the relay action. Third, the spotting confidence score was used as the replay grounding confidence score, and the score of the nearest prediction was multiplied with a factor of 1, and the second-nearest prediction was multiplied by 2. Through experiments, it was found that W=42, S=0:02, $\beta_1$=1.25; and $\beta_2$=0.8 achieved the best performance.

NMS: The grounding results from the Cmn model and the transformer model embodiment were combined, normalizing all event scores to [0.0, 1.0] and applied an NMS (Non-Maximum Suppression) to reduce positive spots within a window size of 25.

The combined post-processing techniques achieved a decent performance improvement, around 12% comparing Row 5 and Row 8. However, the best result was achieved using the transformer-based grounding module embodiment described in Section E.3.b.ii and trained in ultra mode, which is 71.9% as shown in Row 9. Specifically, the transformer was trained in 40 epochs and it took about 3 hours on a TitanX GPU, which is significantly faster than training the Siamese neural network in the baseline approach.

TABLE 4

Experimental results using different number of features; grounding models, including CALF-more-negative (Cmn), Transformer (TF); batch size (BS); and post-processing (PP) techniques, including filtering (FT), fusion (FS), and NMS. For features, 1 for VTN; 2 for TPN-r101 and irCSN; 3 for TPN-r101, irCSN and GTA; 5 for TPN-r101, VTN, GTA, irCSN, and I3D-Slow. TF-u denotes training the transformer in ultra mode. The evaluation metric is average-AP as defined in Deliege et al, cited above.

| Row | Features | Grounding | PP | BS | Challenge |
|---|---|---|---|---|---|
| 1 | ResNet | Cmn | N/A | 32 | 40.75 |
| 2 | 2 | Cmn | N/A | 32 | 52.11 |
| 3 | 3 | Cmn | N/A | 64 | 55.79 |
| 4 | 1 | TF | N/A | 128 | 58.62 |
| 5 | 5 | Cmn | N/A | 128 | 59.26 |
| 6 | 5 | Cmn | FT | 128 | 62.19 |
| 7 | 5 | Cmn | FT, FS | 128 | 64.01 |
| 8 | 5 | Cmn, TF-u | FT, FS, NMS | 128 | 71.59 |
| 9 | 5 | TF-u | FT | 128 | 71.9 | d) Real-World Applications

An action spotting pipeline embodiment was further optimized towards real-world applications, such as automatic highlight generations. 5 key events (i.e., goal, penalty, shots, yellow card, and corner) were selected based on votes by 20 soccer fans. The shot-on-targets and shot-off-targets events were combined as shots events, since both types of shots can be highlights. Instead of using the mAP metric calculated by averaging 5 to 60 seconds tolerance as in Deliege et al. (cited above), the tolerance was limited to be strict 5 seconds, and the performance of the model embodiment was evaluated by precision and recall.

Comparison experiments show that combining 3 features (TPN, irCSN, and I3D-Slow, re-trained on snippets with only 5 events), the average precision and recall of the 5 events can reach 87.04% and 75.21% respectively, which increased about 3% and 8%, respectively, compared to the baseline model that detects 17 events (but only evaluated 5 events). This indicates that that action spotting pipeline embodiment can be optimized towards a smaller set of events that are of greater interest for generating customized game highlights.

5. Some Observations

Embodiments of two-stage paradigms for the action spotting and replay grounding tasks were presented herein. Embodiments included newly developed transformer-based spotting and grounding modules. Also presented were systems and methods involving finetune action recognition models operating on videos to extract semantic features. Embodiments achieved state-of-the-art results on a challenge dataset. Developing the proposed action spotting and replay grounding pipeline is a first step for machines to fully understand other videos, which can dramatically benefit several areas, including sports media, broadcasters, online video posters, and other short video creators. It shall be noted that embodiments can be extended to detect and locate events in other videos.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 33:
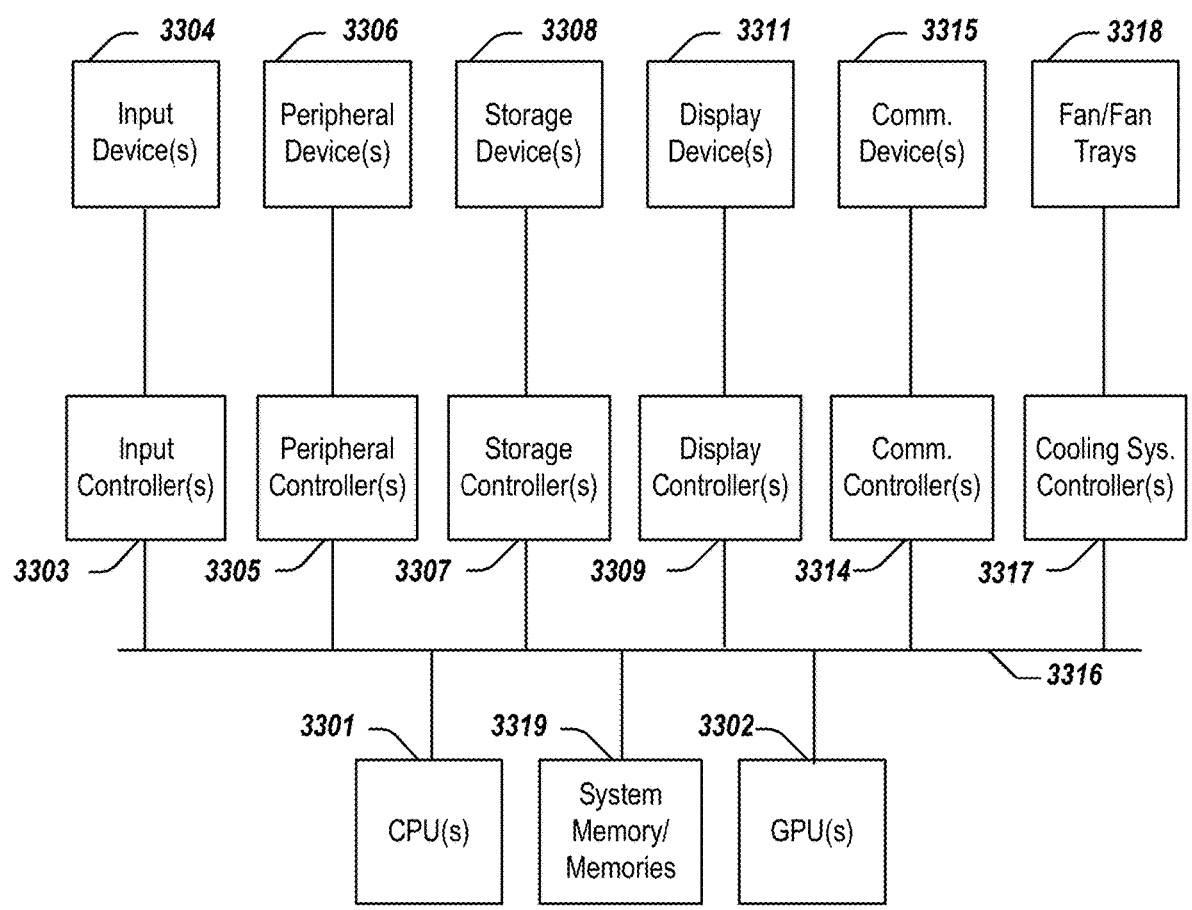
FIG. 33 depicts a simplified block diagram of a computing device/information handling system, according to embodiments of the present disclosure.

FIG. 33 depicts a simplified block diagram of an information handling system (or computing system), according to embodiments of the present disclosure. It will be understood that the functionalities shown for system 3300 may operate to support various embodiments of a computing system—although it shall be understood that a computing system may be differently configured and include different components, including having fewer or more components as depicted in FIG. 33.

As illustrated in FIG. 33, the computing system 3300 includes one or more central processing units (CPU) 3301 that provide computing resources and control the computer. CPU 3301 may be implemented with a microprocessor or the like, and may also include one or more graphics processing units (GPU) 3302 and/or a floating-point coprocessor for mathematical computations. In one or more embodiments, one or more GPUs 3302 may be incorporated within the display controller 3309, such as part of a graphics card or cards. The system 3300 may also include a system memory 3319, which may comprise RAM, ROM, or both.

A number of controllers and peripheral devices may also be provided, as shown in FIG. 33. An input controller 3303 represents an interface to various input device(s) 3304, such as a keyboard, mouse, touchscreen, and/or stylus. The computing system 3300 may also include a storage controller 3307 for interfacing with one or more storage devices 3308 each of which includes a storage medium such as magnetic tape or disk, or an optical medium that might be used to record programs of instructions for operating systems, utilities, and applications, which may include embodiments of programs that implement various aspects of the present disclosure. Storage device(s) 3308 may also be used to store processed data or data to be processed in accordance with the disclosure. The system 3300 may also include a display controller 3309 for providing an interface to a display device 3311, which may be a cathode ray tube (CRT) display, a thin film transistor (TFT) display, organic light-emitting diode, electroluminescent panel, plasma panel, or any other type of display. The computing system 3300 may also include one or more peripheral controllers or interfaces 3305 for one or more peripherals 3306. Examples of peripherals may include one or more printers, scanners, input devices, output devices, sensors, and the like. A communications controller 3314 may interface with one or more communication devices 3315, which enables the system 3300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 3300 comprises one or more fans or fan trays 3318 and a cooling subsystem controller or controllers 3317 that monitors thermal temperature(s) of the system 3300 (or components thereof) and operates the fans/fan trays 3318 to help regulate the temperature.

In the illustrated system, all major system components may connect to a bus 3316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for identifying an action in a video, the method comprising:
   inputting a video into a feature extraction module comprising a plurality of trained neural network action recognition models that each receives as input the video and outputs a series of feature representations in which each feature representation corresponds to a video sequence of one or more video frames of the video;
   for each feature representation from the plurality of trained neural network action recognition models corresponding to a same video sequence, combining the feature representations from the plurality of trained neural network action recognition models to form a combined semantic feature for that video sequence;
   for a set of one or more combined semantic features, obtaining output classification probabilities of actions from a transformer-based temporal detection model, which comprises:
      a summation module, which receives the combined semantic features and corresponding positional encodings as inputs and combines them to form an input for a first transformer encoding layer of a plurality of transformer encoding layers;
      the plurality of transformer encoding layers arrayed sequentially, in which the output of a prior layer is input into a next layer and a first transformer encoding layer receives the output from the summation module; and
      an activation layer that receives an output from a last transformer encoding layer of the plurality of transformer encoding layer and outputs classification probabilities of actions for the set of one or more combined semantic features;
   for the set of one or more combined semantic features, assigning an action label to the action label that has a highest classification probability and is above a threshold value; and
   outputting a video time of the action using a time value or time values correlated to video sequences that correspond to the set of one or more combined semantic features.

2. The computer-implemented method of claim 1 wherein the step of outputting a video time of the action using a time value or time values correlated to video sequences that correspond to the set of one or more combined semantic features, comprises:
   responsive to two more or sequential sets of one or more combined semantic features having been assigned a same action label, identifying a start time of the first video sequence of the first set of one or more combined semantic features and an end time of the last video sequence of the last set of one or more combined semantic features; and
   given the start time and the end time, outputting a video time of the action.

3. The computer-implemented method of claim 1 wherein:
   one or more of the transformer encoding layers employ a multi-head self-attention.

4. The computer-implemented method of claim 1 wherein the step of combining the feature representations from the plurality of trained neural network action recognition models to form a combined semantic feature for that video sequence comprises:
   for at least one or more of the trained neural network action recognition models, multiplying its feature representation by a weighting factor; and
   concatenating the weighting factored feature representations.

5. The computer-implemented method of claim 1 wherein:
   the video time is a single time value or is a time interval.

6. The computer-implemented method of claim 1 wherein the step of outputting a video time of the action using a time value or time values correlated to video sequences that correspond to the set of one or more combined semantic features comprises:
   identifying a middle combined semantic feature of the set of one or more combined semantic features; and identifying the time value as the video time corresponding to a middle video frame of the middle combined semantic feature.

7. The computer-implemented method of claim 1 wherein the transformer-based temporal detection model is trained using binary cross-entropy loss.

8. A computer-implemented method for identifying an action in a video, the method comprising:
for each video from a set of videos comprising a replay video and a candidate video:
inputting the video into a feature extraction module comprising a plurality of trained neural network action recognition models that each receives as input the video and outputs a series of feature representations in which each feature representation corresponds to a video sequence of one or more video frames of the video; and
for each feature representation from the plurality of trained neural network action recognition models corresponding to a same video sequence, combining the feature representations from the plurality of trained neural network action recognition models to form a combined semantic feature for that video sequence;
given a set of combined semantic features for the replay video and a set of combined semantic features for the candidate video, obtaining from a transformer-based model a probability that the candidate video contains an action shown in the replay video and, when deemed present in the candidate video, a video time of the action in the candidate video, the transformer-based model comprising:
a concatenation module, which receives the set of combined semantic features for the replay video and the set of combined semantic features for the candidate video and combines them to form a concatenation output;
a summation module, which receives the concatenation output from the concatenation module and corresponding positional encodings as inputs and combines them to form an input for a first transformer encoding layer of a plurality of transformer encoding layers;
the plurality of transformer encoding layers arrayed sequentially, in which the output of a prior layer is input into a next layer and a first transformer encoding layer receives the output from the summation module; and
an activation layer that receives an output from a last transformer encoding layer of the plurality of transformer encoding layer and outputs the probability that the candidate video contains the action shown in the replay video and, when deemed present in the candidate video, the video time of the action in the candidate video; and
outputting:
an indicator, based upon the probability that the candidate video contains the action shown in the replay video, of whether the candidate video contains the action; and
responsive to the indicator indicating that the candidate video contains the action shown in the replay video, the video time of the action in the candidate video using a time value or time values correlated to video sequences that correspond to one or more combined semantic features for the candidate video.

9. The computer-implemented method of claim 8 wherein the step of outputting the video time of the action in the candidate video using a time value or time values correlated to video sequences that correspond to one or more combined semantic features for the candidate video, comprises:
responsive to two more or sequential sets of one or more combined semantic features for the candidate video having been assigned a same action label, identifying a start time of the first video sequence of the first set of one or more combined semantic features and an end time of the last video sequence of the last set of one or more combined semantic features; and
given the start time and the end time, outputting a video time of the action.

10. The computer-implemented method of claim 9 wherein:
the video time is a single time value or is a time interval.

11. The computer-implemented method of claim 9 wherein the transformer-based model is trained using binary cross-entropy loss.

12. The computer-implemented method of claim 9 wherein:
one or more of the transformer encoding layers employ a multi-head self-attention.

13. The computer-implemented method of claim 9 wherein the step of combining the feature representations from the plurality of trained neural network action recognition models to form a combined semantic feature for that video sequence comprises:
for at least one or more of the trained neural network action recognition models, multiplying its feature representation by a weighting factor to obtain weighted feature representation; and
concatenating the feature representations or weighted feature representations from the plurality of trained neural network action recognition models to form the combined semantic feature for that video sequence.

14. The computer-implemented method of claim 8 wherein the step of outputting a video time of the action using a time value or time values correlated to video sequences that correspond to the set of one or more combined sematic features comprises:
identifying a middle combined semantic feature of the set of one or more combined semantic features; and
identifying the time value as the video time corresponding to a middle video frame of the middle combined semantic feature.

15. A system comprising:
one or more processors; and
a non-transitory computer-readable medium or media comprising one or more sets of instructions which, when executed by at least one of the one or more processors, causes steps to be performed comprising:
inputting a video into a feature extraction module comprising a plurality of trained neural network action recognition models that each receives as input the video and outputs a series of feature representations in which each feature representation corresponds to a video sequence of one or more video frames of the video;
for each feature representation from the plurality of trained neural network action recognition models corresponding to a same video sequence, combining the feature representations from the plurality of trained neural network action recognition models to form a combined semantic feature for that video sequence;

for a set of one or more combined semantic features, obtaining output classification probabilities of actions from a transformer-based temporal detection model, which comprises:
- a summation module, which receives the combined semantic features and corresponding positional encodings as inputs and combines them to form an input for a first transformer encoding layer of a plurality of transformer encoding layers;
- the plurality of transformer encoding layers arrayed sequentially, in which the output of a prior layer is input into a next layer and a first transformer encoding layer receives the output from the summation module; and
- an activation layer that receives an output from a last transformer encoding layer of the plurality of transformer encoding layer and outputs classification probabilities of actions for the set of one or more combined semantic features;

for the set of one or more combined semantic features, assigning an action label to the action label that has a highest classification probability and is above a threshold value; and outputting a video time of the action using a time value or time values correlated to video sequences that correspond to the set of one or more combined semantic features.

16. The system of claim 15 wherein the step of outputting a video time of the action using a time value or time values correlated to video sequences that correspond to the set of one or more combined semantic features, comprises:
- responsive to two more or sequential sets of one or more combined semantic features having been assigned a same action label, identifying a start time of the first video sequence of the first set of one or more combined semantic features and an end time of the last video sequence of the last set of one or more combined semantic features; and
- given the start time and the end time, outputting a video time of the action.

17. The system of claim 15 wherein:
one or more of the transformer encoding layers employ a multi-head self-attention.

18. The system of claim 15 wherein the step of combining the feature representations from the plurality of trained neural network action recognition models to form a combined semantic feature for that video sequence comprises:
- for at least one or more of the trained neural network action recognition models, multiplying its feature representation by a weighting factor; and
- concatenating the weighting factored feature representations.

19. The system of claim 15 wherein:
the video time is a single time value or is a time interval.

20. The system of claim 15 wherein the step of outputting a video time of the action using a time value or time values correlated to video sequences that correspond to the set of one or more combined sematic features comprises:
- identifying a middle combined semantic feature of the set of one or more combined semantic features; and
- identifying the time value as the video time corresponding to a middle video frame of the middle combined semantic feature.

* * * * *